US012624054B2

(12) United States Patent
Sa et al.

(10) Patent No.: US 12,624,054 B2
(45) Date of Patent: May 12, 2026

(54) ORGANOZINC COMPOUND PREPARATION METHOD, CHAIN TRANSFER AGENT, BLOCK COPOLYMER, AND RESIN COMPOSITION

(71) Applicant: LG Chem, Ltd., Seoul (KR)

(72) Inventors: Seok Pil Sa, Daejeon (KR); Eun Ji Shin, Daejeon (KR); Ki Soo Lee, Daejeon (KR); Bun Yeoul Lee, Gyeonggi-do (KR); Jong Chul Lee, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 579 days.

(21) Appl. No.: 18/017,205

(22) PCT Filed: Jul. 30, 2021

(86) PCT No.: PCT/KR2021/009967

§ 371 (c)(1),
(2) Date: Jan. 20, 2023

(87) PCT Pub. No.: WO2022/025701

PCT Pub. Date: Feb. 3, 2022

(65) Prior Publication Data

US 2023/0295189 A1 Sep. 21, 2023

(30) Foreign Application Priority Data

Jul. 31, 2020 (KR) ........................ 10-2020-0096160
Jul. 29, 2021 (KR) ........................ 10-2021-0100045

(51) Int. Cl.

*C07F 3/06* (2006.01)
*C07F 7/08* (2006.01)
*C08F 297/02* (2006.01)

(52) U.S. Cl.

CPC .............. *C07F 3/06* (2013.01); *C07F 7/0803* (2013.01); *C07F 7/083* (2013.01); *C08F 297/02* (2013.01)

(58) Field of Classification Search

CPC ............ C07F 3/06; C07F 7/0803; C08F 2/38; C08F 297/02

See application file for complete search history.

(56) References Cited

U.S. PATENT DOCUMENTS

| | | | |
|---|---|---|---|
| 6,117,372 | A | 9/2000 | Bogdanovic et al. |
| 2009/0163667 | A1 | 6/2009 | Arriola et al. |
| 2011/0092651 | A1 | 4/2011 | Arriola et al. |
| 2012/0083575 | A1 | 4/2012 | Hustad et al. |
| 2014/0148565 | A1 | 5/2014 | Denkwitz et al. |
| 2017/0022305 | A1 | 1/2017 | Denkwitz et al. |
| 2018/0022852 | A1 | 1/2018 | Lee et al. |
| 2020/0369692 | A1 | 11/2020 | Mariott et al. |
| 2021/0002303 | A1 | 1/2021 | Sa et al. |
| 2021/0002473 | A1 | 1/2021 | Lee et al. |
| 2021/0017377 | A1 | 1/2021 | Shin et al. |
| 2021/0108066 | A1 | 4/2021 | Hong et al. |

FOREIGN PATENT DOCUMENTS

| | | | |
|---|---|---|---|
| CN | 111417660 | A | 7/2020 |
| JP | H06041151 | A | 2/1994 |
| JP | 2000514444 | A | 10/2000 |
| JP | 2010222335 | A | 10/2010 |
| JP | 2012017475 | A | 1/2012 |
| JP | 2014184948 | A | 10/2014 |
| KR | 101657925 | B1 | 9/2016 |
| KR | 101732418 | B1 | 5/2017 |
| KR | 20170107329 | A | 9/2017 |
| KR | 101829382 | B1 | 2/2018 |
| KR | 101848781 | B1 | 4/2018 |
| KR | 20190114713 | A | 10/2019 |
| KR | 20190114716 | A | 10/2019 |
| KR | 20190115716 | A | 10/2019 |
| TW | 201422656 | A | 6/2014 |
| WO | 2019190287 | A1 | 10/2019 |
| WO | 2019190288 | A1 | 10/2019 |
| WO | 2019190289 | A1 | 10/2019 |
| WO | 2019190292 | A1 | 10/2019 |

OTHER PUBLICATIONS

Supporting information for Lee et al., "Styrene Moiety-Carrying Diorganozinc Compound Preparation for Polystyrene-Poly(ethylene-co-1hexene)-Polystyrene Triblock Copolymer Production," Macromolecules 53, 7274-7284 (Aug. 19, 2020).*

Cote, A. et al., "General Method for the Expedient Synthesis of Salt-Free Diorganozinc Reagents Using Zinc Methoxide," Journal of the American Chemical Society, Feb. 12, 2008, pp. 2771-2773, vol. 130, No. 9.

International Search Report for Application No. PCT/KR2021/009967 mailed Nov. 26, 2021, 3 pages.

Kim, C.S. et al., "Polystyrene Chain Growth from Di-End-Functional Polyolefins for Polystyrene-Polyolefin-Polystyrene Block Copolymers," Polymers, Oct. 2, 2017, pp. 1-14, vol. 9, No. 481.

Lee, J.C. et al., "Styrene Moiety-Carrying Diorganozinc Compound Preparation for Polystyrene-Poly(ethylene-co-1-hexene)-Polystyrene Triblock Copolymer Production," Macromolecules, Aug. 19, 2020, pp. 7274-7284, vol. 53.

Park, S.S. et al., "Biaxial Chain Growth of Polyolefin and Polystyrene from 1,6-Hexanediylzinc Species for Triblock Copolymers," Macromolecules, Aug. 21, 2017, pp. 6606-6616, vol. 50.

(Continued)

*Primary Examiner* — Kregg T Brooks
(74) *Attorney, Agent, or Firm* — Lerner David LLP

(57) ABSTRACT

The present invention relates to a chain transfer agent including an organozinc compound, a preparation method thereof, and a method for preparing a block copolymer using the same. A chain transfer agent prepared by a preparation method including preparing a Grignard reagent containing styrene residues, and reacting the prepared Grignard reagent with alkyl zinc alkoxide, which is a zinc compound, has not catalyst poison and by-products, and contains 96 wt % or more of a target compound. A block copolymer polymerized using the chain transfer agent and a resin composition including the block copolymer have excellent mechanical properties.

11 Claims, 2 Drawing Sheets

(56) References Cited

OTHER PUBLICATIONS

Alexandre Co te et al., General Method for the Expedient Synthesis of Salt-Free Diorganozinc Reagents Using Zinc Methoxide, J. Am. Chem. Soc. Feb. 2008, 130, Supporting. 5 pgs.

* cited by examiner

ORGANOZINC COMPOUND PREPARATION METHOD, CHAIN TRANSFER AGENT, BLOCK COPOLYMER, AND RESIN COMPOSITION

CROSS-REFERENCE TO RELATED APPLICATIONS

The present application is a national stage entry under 35 U.S.C. § 371 of International Application No. PCT/KR2021/009967 filed on Jul. 30, 2021, which claims priority from Korean Patent Application Nos. 10-2020-0096160 filed on Jul. 31, 2020, and 10-2021-0100045 filed on Jul. 29, 2021, all the disclosures of which are incorporated herein by reference.

TECHNICAL FIELD

The present invention relates to an organozinc compound preparation method, a chain transfer agent, a block copolymer, and a resin composition, and specifically, to a method for preparing an organozinc compound having styrene residues which may be used for coordination chain transfer polymerization (CCTP) in the preparation of a block copolymer, the method for preparing an organozinc compound synthesized as a single compound without side reactions, thereby having excellent synthesis reproducibility and polymerization reproducibility, a chain transfer agent including an organozinc compound prepared thereby, a block copolymer polymerized using the same, and a resin composition including the block copolymer.

BACKGROUND ART

The synthesis and application of a block copolymer is a major topic in a polymer-related field. In recent years, a lot of attention has been paid to a block copolymer based on polyolefin (PO). A representative block copolymer is PS-Block-Polybutadiene-Block-PS (SBS, wherein PS is polystyrene), which is produced at a scale of 2 million tons per year worldwide through controlled anionic polymerization, as shown in Reaction Equation 1 below. The hydrogenation of the intermediate block segment (i.e., polybutadiene block) of the SBS provides a value-added product, PS-block-poly (ethylene-co-1-butene)-block-PS (SEBS), which is commercialized at a scale of 300,000 tons per year worldwide.

[Reaction Equation 1]

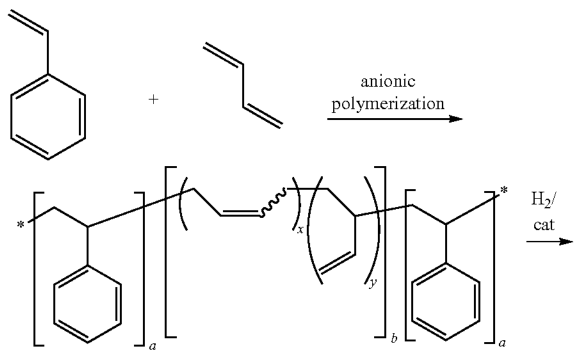

SBS

-continued

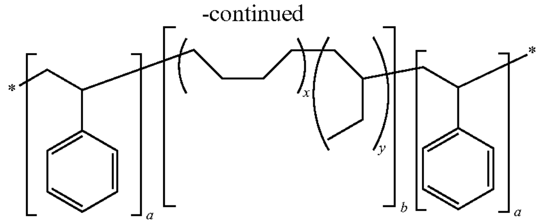

SEBS

SBS is excellent in all of weather resistance, heat resistance, abrasion resistance, impact resistance, adhesiveness, transparency, and recyclability, and thus, there is a growing demand for SEBS. However, the hydrogenation of a polymer requires a catalytic reaction in the molten state of the polymer, and accordingly, a complex process such as a catalyst removal process is necessarily accompanied, so that SEBS is sold at a price that is at least three times higher than the price of SBS, and the high resin price poses as an obstacle to market expansion.

In addition, the impossibility of heat treatment of SEBS is also an obstacle to market expansion. Commercial grade SEBS is prepared through controlled anionic polymerization, and thus, exhibits a very narrow molecular weight distribution, and accordingly, does not flow in molten state. In addition, SEBS is usually used in combination with other polymers rather than being used alone. While most bulk polymers are pelletized, and thus, are conveniently supplied, SEBS is only obtained in the form of a lumpy powder, and thus, is not conveniently supplied.

Therefore, as a method to solve the above problems in the preparation of SEBS, Korean Patent Laid-Open Publication No. 1829382 (Patent Document 1) proposes a one-pot synthesis of a triblock copolymer which is similar to SEBS. Specifically, Patent Document 1 discloses that a polyolefin (PO) chain is grown through coordinative chain transfer polymerization (CCTP) from a diorganozinc compound having styrene residues, and then the polystyrene (PS) chain is grown through anionic polymerization in one-pot from a Zn—C binding site and the styrene residues. Here, Patent Document 1 discloses a method for preparing a diorganozinc compound through hydroboration of divinylbenzene, as shown in Reaction Equation 2 below.

[Reaction Equation 2]

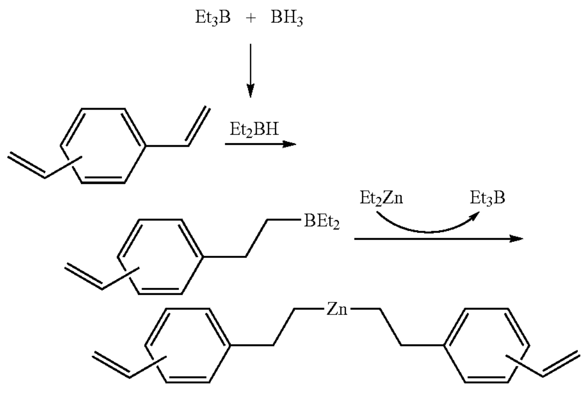

However, when a diorganozinc compound is prepared through hydroboration of divinylbenzene as in Reaction Equation 2 according to Patent Document 1, triethyl borane ($Et_3B$) and diethyl zinc ($Et_2Zn$) should be used in excess, but triethyl borane and diethyl zinc are highly flammable, and thus, are very dangerous. In addition, triethyl borane is continuously generated as a reaction intermediate, and if triethyl borane remains in the CCTP stage, it acts as a catalyst poison, and thus, should be continuously removed.

In addition, when a diorganozinc compound is prepared through hydroboration of divinylbenzene as in Reaction Equation 2 above, there is a problem in that divinylbenzene which is used as a reactant has a low purity. Particularly, since divinylbenzene generally contains about 20 mol % of ethylvinylbenzene, when CCTP is performed using a diorganozinc compound, polystyrene cannot be grown from an ethyl group by anionic polymerization, which causes the generation of a diblock copolymer.

In addition, since divinylbenzene includes two vinyl groups, when the hydroboration proceeds simultaneously in the two vinyl groups, a dimer, a trimer, and the like containing two or more zinc are inevitably generated. Therefore, in order to reduce the generation of a dimer, a trimer, and the like, divinylbenzene should be used in a large amount, which is about three times or more than that of triethyl borane.

Furthermore, when a diorganozinc compound is prepared in consideration of all of the above problems, since the hydroboration of divinylbenzene is an equilibrium reaction, it is very difficult to ensure synthesis reproducibility. Also, the prepared diorganozinc compound is obtained as a mixture including, on average, about 82.4 mol % of a compound having a vinyl group as a terminal, about 9.2 mol % of a compound having an ethyl group as a terminal, and about 8.5 mol % of a compound which is a dimer, wherein even if only the compound having a vinyl group as a terminal is selectively purified, since divinylbenzene is a mixture of an ortho isomer, a meta isomer, and a para isomer, the terminal vinyl group of the prepared diorganozinc compound is present in all of ortho, meta, and para positions, so that when CCTP is performed using the prepared diorganozinc compound, it cannot be guaranteed that block connection structures of block copolymers to be prepared all represents the same structure.

In addition, Korean Patent Laid-Open Publication No. 1732418 (Patent Document 2) also proposes a one-pot synthesis of a triblock copolymer which is similar to SEBS, as shown in the above Patent Document 2. Specifically, Patent Document 2 discloses that a polyolefin (PO) chain is grown through coordinative chain transfer polymerization (CCTP) from a diorganozinc compound having α-methylstyrene residues, and then the polystyrene (PS) chain is grown through anionic polymerization in one-pot from a Zn—C binding site and the α-methylstyrene residues. Here, Patent Document 2 discloses a method in which magnesium metal powder is introduced to 1-chloromethyl-4-isopropenylbenzene to prepare a Grignard reagent, and then a diorganozinc compound having α-methylstyrene residues is prepared through a metathesis reaction with zinc chloride ($ZnCl_2$).

However, as in the Patent Document 2, when a diorganozinc compound is prepared through the reaction between a Grignard reagent and zinc chloride, impurities containing magnesium and chlorine (Mg(α-methylstyrene residues)$_2$, (α-methylstyrene residues)-Mg—Cl, and (α-methylstyrene residues)-Zn—Cl) which may act as catalyst poisons remain, so that the impurities should be removed through performing recrystallization several times with an organic solvent such as hexane. Therefore, there is a problem in that quality reproducibility is not ensured each time of synthesis.

In addition, in order to perform CCTP, a diorganozinc compound should be used in excess with respect to a catalyst (e.g., hafnium complex, etc.) for performing the CCTP. However, when impurities remain in the diorganozinc compound as described above, the catalyst is inactivated even with a trace amount of the impurities, so that in some cases, the CCTP may not be performed.

Furthermore, in a diorganozinc compound containing α-methylstyrene residues disclosed in Patent Document 2, the α-methylstyrene residues is inevitably accompanied by steric hindrance due to α-methyl during anionic polymerization, so that there is a problem in that the anion initiation efficiency is low compared to styrene residues. Accordingly, when anionic polymerization is performed in the same polymerization environment, the growth of a PS chain is not facilitated on the side of the α-methylstyrene residues, and rather, a PS homopolymer is generated at a ratio of 40 wt % to 50 wt %, which becomes a factor that inhibits the production of a triblock copolymer.

PRIOR ART DOCUMENT

Patent Document (Patent Document 1) KR10-1829382B1
(Patent Document 2) KR10-1732418B2

DISCLOSURE OF THE INVENTION

Technical Problem

An aspect of the present invention provides a method for preparing an organozinc compound containing styrene residues, when preparing a block copolymer, which may be used for coordinative chain transfer polymerization (CCCP), does not use triethyl borane, thereby ensuring work safety, is synthesized as a single compound, thereby not including a side reaction product such as a dimer, and furthermore, does not include impurities containing chlorine which may act as a catalytic poison, and also facilitates the removal of impurities containing magnesium which may act as a catalyst poison.

Another aspect of the present invention provides a chain transfer agent for preparing a block copolymer by coordinative chain transfer polymerization, which includes an organozinc compound prepared according to the method for preparing an organozinc compound, and thus has excellent synthesis reproducibility and polymerization reproducibility.

Another aspect of the present invention provides a polystyrene-polyolefin block copolymer prepared by coordinative chain transfer polymerization and anionic polymerization using the chain transfer agent, thereby having a wide molecular weight distribution and excellent mechanical properties.

Another aspect of the present invention provides a resin composition including the block copolymer, thereby having excellent dispersibility for polypropylene, and thus, excellent mechanical physical properties.

Technical Solution

According to an aspect of the present invention, there is provided a method for preparing an organozinc compound, the method including preparing a Grignard reagent containing styrene residues, and reacting the prepared Grignard reagent with a zinc compound to prepare an organozinc compound represented by Formula 1 below, wherein the zinc compound is alkyl zinc alkoxide.

[Formula 1]

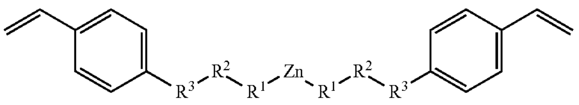

In Formula 1 above, $R^1$ and $R^3$ are each independently a single bond or an alkylene group having 1 to 10 carbon atoms, $R^2$ is an alkylene group having 1 to 10 carbon atoms or $—SiR^4R^5—$, and $R^4$ and $R^5$ are each independently an alkyl group having 1 to 10 carbon atoms.

According to another aspect of the present invention, there is provided a chain transfer agent including an organozinc compound represented by Formula 1 above, wherein the chain transfer agent includes 96 mol % or more of the organozinc compound represented by Formula 1 above in the chain transfer agent.

According to another aspect of the present invention, there is provided a block copolymer including an aromatic vinyl-based polymer block and an olefin-based polymer block, wherein the block polymer has a molecular weight distribution (Mw/Mn) of 1.2 or greater.

According to another aspect of the present invention, there is provided a resin composition including the block copolymer and polypropylene.

Advantageous Effects

When an organozinc compound is prepared according to the method for preparing an organozinc compound according to the present invention, triethyl borane is not used so that work safety is ensured, and there are effects in that a single compound is synthesized so that a side reaction product such as a dimer is not included, impurities containing chlorine which may act as a catalytic poison are not included, and the removal of impurities containing magnesium which may act as a catalyst poison is facilitated.

In addition, a chain transfer agent including an organozinc compound prepared according to the method for preparing an organozinc compound according to the present invention is excellent in synthesis reproducibility and polymerization reproducibility.

In addition, a block copolymer prepared by coordinative chain transfer polymerization and anionic polymerization using the chain transfer agent according to the present invention has a wide molecular weight distribution and excellent mechanical properties.

In addition, a resin composition according to the present invention includes the above block copolymer, thereby having excellent dispersibility for polypropylene, and thus, excellent mechanical physical properties.

MODE FOR CARRYING OUT THE INVENTION

Figure 1:
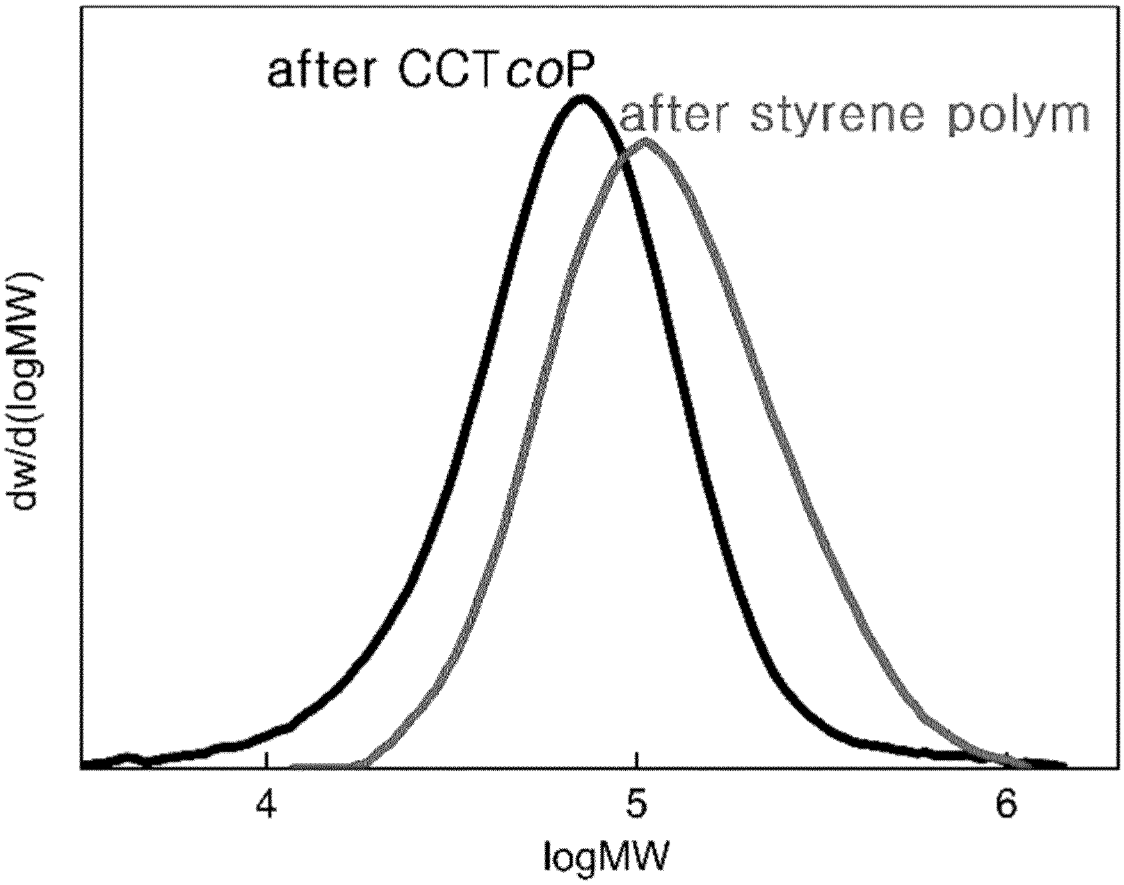
FIG. 1 is a graph of GPC curves of a polymer (i.e., poly(ethylene-co-1-hexene)) according to chain transfer coordinative polymerization and a block copolymer according to anionic polymerization in accordance with Examples 1 to 5 of the present invention.

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present invention, the term 'monomer unit' may refer to a component, structure, or material itself derived from a monomer. A specific example thereof may be a repeating unit which is formed in a polymer by a monomer introduced and participating in a polymerization reaction during the polymerization of the polymer.

The term 'polymer' used herein may refer to a homopolymer formed by being polymerized from one type of monomer, and the term 'copolymer' may refer to a copolymer formed by being polymerized from two or more types of co-monomers. In addition, the 'copolymer' may refer to a 'random copolymer' in which two or more types of co-monomers are randomly co-polymerized unless otherwise unless otherwise states as a 'block.'

The term 'block' used herein may refer to a group of repeating units composed of only repeating units derived from the same monomer or repeating units derived from the same co-monomer since only the same monomer or the same co-monomer has participated in a polymerization reaction in a copolymer. As specific examples, an aromatic vinyl-based polymer block may mean a block formed of only an aromatic vinyl monomer unit, and an olefin-based polymer block may mean a block formed of only one or more olefin-based monomer units.

The term 'anionic active polymer' used herein refers to a polymer formed by an anionic polymerization reaction, and may refer to a polymer capable of additional polymerization or reaction since a terminal on one side of the polymer maintains an anionic state. A specific example thereof may be a living anionic polymer.

The term 'composition' used herein includes not only a reaction product and a decomposition product formed from materials of a corresponding composition but also a mixture of materials including the corresponding composition.

Preparation of Organozinc Compound

The present invention provides a method for preparing an organozinc compound.

According to an embodiment of the present invention, the method for preparing an organozinc compound includes preparing a Grignard reagent containing styrene residues, and reacting the prepared Grignard reagent with a zinc compound to prepare an organozinc compound represented by Formula 1 below, wherein the zinc compound may be alkyl zinc alkoxide.

[Formula 1]

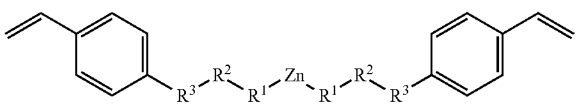

In Formula 1 above, $R^1$ and $R^3$ may each independently be a single bond or an alkylene group having 1 to 10 carbon atoms, $R^2$ may be an alkylene group having 1 to 10 carbon atoms or —$SiR^4R^5$—, and $R^4$ and $R^5$ may each independently be an alkyl group having 1 to 10 carbon atoms.

According to an embodiment of the present invention, in Formula 1 above, $R^1$ and $R^3$ may each independently be a single bond or an alkylene group having 1 to 3 carbon atoms, $R^2$ may be an alkylene group having 1 to 3 carbon atoms or —$SiR^4R^5$—, and $R^4$ and $R^5$ may each independently be an alkyl group having 1 to 3 carbon atoms.

According to an embodiment of the present invention, in Formula 1 above, $R^1$ and $R^3$ may each independently be a single bond or an alkylene group having 1 carbon atom, $R^2$ may be an alkylene group having 1 carbon atom or —$SiR^4R^5$—, and $R^4$ and $R^5$ may each independently be an alkyl group having 1 carbon atom.

According to an embodiment of the present invention, the organozinc compound represented by Formula 1 above may be one or more selected from the group consisting of organozinc compounds represented by Formulas 1-1 to 1-4 below, and may preferably be any one of Formulas 1-3 and 1-4.

[Formula 1-1]

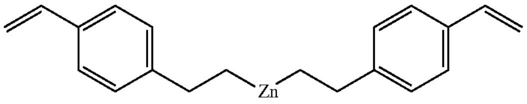

[Formula 1-2]

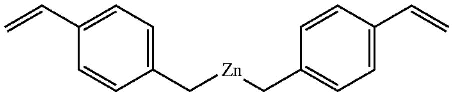

[Formula 1-3]

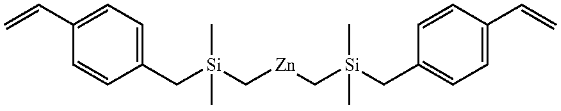

[Formula 1-4]

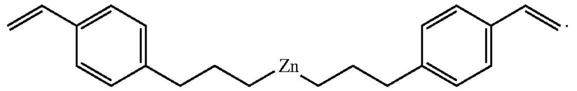

According to an embodiment of the present invention, the organozinc compound represented by Formula 1 above prepared according to the method for preparing an organozinc compound is synthesized as a single compound, and thus, does not include a side reaction product such as a dimer, and furthermore, does not include impurities containing chlorine which may act as a catalyst poison, for example, organic zinc chloride (R—Zn—Cl). In addition, when the organozinc compound represented by Formula 1 above is prepared according to the method for preparing an organozinc compound, the organozinc compound is synthesized as a single compound, and thus, has excellent synthesis reproducibility. Meanwhile, in the preparation of an organozinc compound, in order not to include a side reaction product and impurities as in the present invention, it may be important to select a Grignard reagent containing styrene residues and a zinc compound.

According to an embodiment of the present invention, the Grignard reagent containing styrene residues may be represented by Formula 2 below.

[Formula 2]

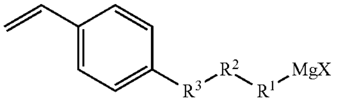

In Formula 2 above, $R^1$ and $R^3$ may each independently be a single bond or an alkylene group having 1 to 10 carbon atoms, $R^2$ may be an alkylene group having 1 to 10 carbon atoms or —$SiR^4R^5$—, $R^4$ and $R^5$ may each independently be an alkyl group having 1 to 10 carbon atoms, and X may be a halogen group.

According to an embodiment of the present invention, in Formula 2 above, $R^1$ and $R^3$ may each independently be a single bond or an alkylene group having 1 to 3 carbon atoms, $R^2$ may be an alkylene group having 1 to 3 carbon atoms or —$SiR^4R^5$—, $R^4$ and $R^5$ may each independently be an alkyl group having 1 to 3 carbon atoms, and X may be a halogen group.

According to an embodiment of the present invention, in Formula 2 above, $R^1$ and $R^3$ may each independently be a single bond or an alkylene group having 1 carbon atom, $R^2$ may be an alkylene group having 1 carbon atom or —$SiR^4R^5$—, $R^4$ and $R^5$ may each independently be an alkyl group having 1 carbon atom, and X may be a halogen group selected from the group consisting of Cl, Br, and I.

According to an embodiment of the present invention, the Grignard reagent containing styrene residues and represented by Formula 2 above may be one selected from the group consisting of Grignard reagents containing styrene residues and represented by Formula 2-1 to 2-4 below.

[Formula 2-1]

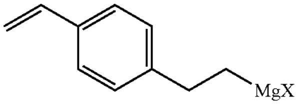

[Formula 2-2]

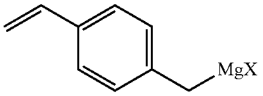

[Formula 2-3]

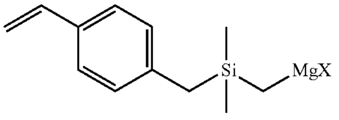

[Formula 2-4]

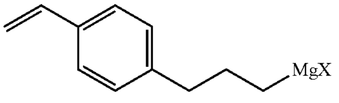

According to an embodiment of the present invention, the Grignard reagent containing styrene residues and represented by Formula 2 above may be prepared through the reaction between a halide in which halide(-X) is substituted with $R^1$ and magnesium, specifically, magnesium powder or magnesium metal.

According to an embodiment of the present invention, the Grignard reagent containing styrene residues and represented by Formula 2 above may be prepared through the reaction of a compound represented by Formula 3 below and magnesium, specifically, magnesium powder or magnesium metal.

[Formula 3]

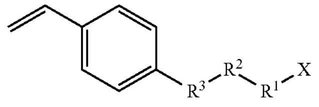

In Formula 3 above, $R^1$ and $R^3$ may each independently be a single bond or an alkylene group having 1 to 10 carbon atoms, $R^2$ may be an alkylene group having 1 to 10 carbon atoms or —$SiR^4R^5$—, $R^4$ and $R^5$ may each independently be an alkyl group having 1 to 10 carbon atoms, and X may be a halogen group.

According to an embodiment of the present invention, in Formula 3 above, $R^1$ and $R^3$ may each independently be a single bond or an alkylene group having 1 to 3 carbon atoms, $R^2$ may be an alkylene group having 1 to 3 carbon atoms or —$SiR^4R^5$—, $R^4$ and $R^5$ may each independently be an alkyl group having 1 to 3 carbon atoms, and X may be a halogen group.

According to an embodiment of the present invention, in Formula 3 above, $R^1$ and $R^3$ may each independently be a single bond or an alkylene group having 1 carbon atom, $R^2$ may be an alkylene group having 1 carbon atom or —$SiR^4R^5$—, $R^4$ and $R^5$ may each independently be an alkyl group having 1 carbon atom, and X may be a halogen group selected from the group consisting of Cl, Br, and I.

According to an embodiment of the present invention, the compound represented by Formula 3 above may be one selected from the group consisting of compounds represented by Formulas 3-1 to 3-4 below.

[Formula 3-1]

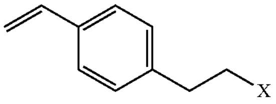

[Formula 3-2]

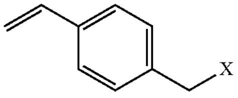

[Formula 3-3]

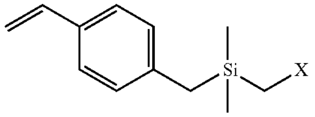

[Formula 3-4]

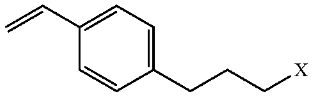

According to an embodiment of the present invention, when the Grignard reagent containing styrene residues and represented by Formula 2 above is prepared, the reaction between the compound represented by Formula 3 and the magnesium powder or magnesium metal may be performed in a molar ratio of the magnesium powder or magnesium metal in excess to 1 mole of the compound represented by Formula 3 based on the molar ratio, that is, a molar ratio of greater than 1 mole. In this case, at least 50 mol %, at least 60 mol %, at least 70 mol %, at least 80 mol %, at least 90 mol %, at least 95 mol %, or at least 99 mol % of the compound represented by Formula 3 above may be converted to the Grignard reagent containing styrene residues and represented by Formula 2 above.

According to an embodiment of the present invention, the reaction between the compound represented by Formula 3 above and the magnesium powder or magnesium metal may be performed in a molar ratio of greater than 1:1 to 1:10, greater than 1:1 to 1:5, greater than 1:1 to 1:2, or 1:1.01 to 1:1.60, based on the molar ratio. Within this range, the conversion rate to the Grignard reagent containing styrene residues and represented by Formula 2 is high, and the content of residual magnesium after the reaction may be minimized to facilitate the removal of residual magnesium powder or magnesium metal.

According to an embodiment of the present invention, it is necessary for the zinc compound to be a zinc compound capable of inducing two organic groups of the same type to be substituted with zinc in the preparation of an organozinc compound. Therefore, as described above, zinc chloride ($ZnCl_2$) may be easily considered. However, when zinc chloride is used as a zinc compound, there is a problem in that impurities (e.g., alkyl zinc chloride) containing chlorine which may act as a catalyst poison remain. Therefore, the present invention uses alkyl zinc alkoxide as the zinc compound.

According to an embodiment of the present invention, the alkyl group of the alkyl zinc alkoxide may be an alkyl group having 1 to 10 carbon atoms, an alkyl group having 1 to 5 carbon atoms, an alkyl group having 1 to 3 carbon atoms, or an ethyl group, and the alkoxide group may be an alkoxide group having 1 to 10 carbon atoms, an alkoxide group having 1 to 5 carbon atoms, an alkoxide group having 1 to 3 carbon atoms, or a methoxide group. As a specific example, the zinc compound may be ethyl zinc methoxide.

According to an embodiment of the present invention, the alkyl zinc alkoxide may be prepared from dialkyl zinc. As a specific example, the alkyl zinc alkoxide may be prepared by reacting dialkyl zinc with alcohol in situ. At this time, the alkyl group of the dialkyl zinc may be the same as the alkyl group of the alkyl zinc alkoxide described above, and the alcohol may be an alcohol in which hydrogen is bonded to the alkoxide group of the alkyl zinc alkoxide described above.

According to an embodiment of the present invention, when the alkyl zinc alkoxide is used as the zinc compound, during the reaction between the Grignard reagent and the zinc compound, halogenated magnesium alkoxide is generated, which is an insoluble salt, so that filtration is facilitated to prevent impurities from remaining.

According to an embodiment of the present invention, the reaction between the Grignard reagent and the zinc compound may be performed in a molar ratio of 10:1 to 1:10, 5:1 to 1:5, 3:1 to 1:3, 2:1 to 1:2, 1.5:1 to 1:1.5, or 1:1 based on the molar ratio. Within this range, there are effects in that a single compound is synthesized so that a side reaction product such as a dimer is not included, impurities containing chlorine which may act as a catalytic poison are not included, and the removal of impurities containing magnesium which may act as a catalyst poison is facilitated.

According to an embodiment of the present invention, all steps and all reactions of the method for preparing a zinc compound may performed in an organic solvent, and the reaction temperature and reaction pressure may be adjusted according to the purpose of increasing yield and purity.

In the method for preparing a zinc compound according to an embodiment of the present invention, a typical borane-based compound including styrene residues is replaced by a Grignard reagent including styrene residues, and alkyl zinc or zinc chloride is replaced with an alkyl zinc alkoxide, so that a catalyst poison may be completely removed.

In addition, through improvement of the above method, unlike the prior art in which a product is obtained as a mixture of a dimer, a trimer, and a terminal-saturated zinc compound, a compound in the form of a monomer having a fully preserved terminal vinyl may be obtained as a single compound, so that not only the storage stability of a zinc compound, but also the physical properties of a copolymer to be finally produced may be improved, and it is possible to achieve the effect of greatly reducing the generation amount of diblock copolymers, which not a triblock.

Chain Transfer Agent

The present invention provides a chain transfer agent including an organozinc compound prepared by the method for preparing an organozinc compound. As a specific example, the chain transfer agent may be a chain transfer agent for preparing a block copolymer by coordinative chain transfer polymerization.

According to an embodiment of the present invention, the chain transfer agent includes an organozinc compound represented by Formula 1 below, and the chain transfer agent includes 96 mol % or more of the organozinc compound represented by Formula 1 below, and preferably, may not include a side reaction product other than the organozinc compound represented by Formula 1 below.

[Formula 1]

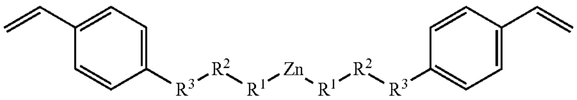

In Formula 1 above, $R^1$ and $R^3$ may each independently be a single bond or an alkylene group having 1 to 10 carbon atoms, $R^2$ may be an alkylene group having 1 to 10 carbon atoms or —$SiR^4R^5$—, and $R^4$ and $R^5$ may each independently be an alkyl group having 1 to 10 carbon atoms.

According to an embodiment of the present invention, the chain transfer agent is prepared by the method for preparing an organozinc compound, and thus, the organozinc compound represented by Formula 1 above may be the same as the organozinc compound represented by Formula 1 described in the method for preparing an organozinc compound above.

According to an embodiment of the present invention, the chain transfer agent may include preferably 97 mol % or more, more preferably 98 mol % or more, or 99 mol % or more of the organozinc compound of Formula 1 above, and most preferably, may not include a side reaction product other than the organozinc compound. This means that other than the organozinc compound represented by Formula 1, a side reaction product such as a dimer as well as impurities containing chlorine or magnesium are not included.

That is, the chain transfer agent may include only the organozinc compound represented by Formula 1 above. As a specific example, the chain transfer agent is prepared according to the method for preparing an organozinc compound, and thus, is synthesized as a single compound of the organozinc compound represented by Formula 1 above, and does not include a side reaction product such as a dimer, and furthermore, does not include impurities containing chlorine which may act as a catalyst poison, and also, does not include impurities containing magnesium which may act as a catalyst poison since the impurities are all removed therefrom. Accordingly, the chain transfer agent has excellent polymerization reproducibility during coordinative chain transfer polymerization for the preparation of a block copolymer, and may improve processability by inducing a high molecular weight distribution during the preparation of the block copolymer.

Block Copolymer and Preparation Method Thereof

The present invention provides a block copolymer polymerized using the chain transfer agent, and a preparation method thereof.

According to an embodiment of the present invention, the block copolymer includes an aromatic vinyl-based polymer block and an olefin-based polymer block, wherein the block polymer may have a molecular weight distribution (Mw/Mn) of 1.2 or greater.

According to an embodiment of the present invention, the block copolymer may be a triblock copolymer including an aromatic vinyl-based polymer block-olefin-based polymer block-aromatic vinyl-based polymer block. A specific example thereof may be polystyrene-block-poly(ethylene-co-olefin)-block-polystyrene.

According to an embodiment of the present invention, the block copolymer may include a repeating unit represented by Formula 6 below.

[Formula 6]

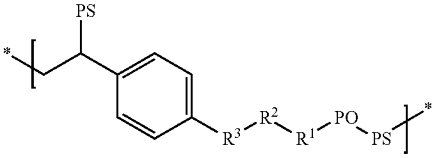

In Formula 6 above, $R^1$ and $R^3$ may each independently be a single bond or an alkylene group having 1 to 10 carbon atoms, $R^2$ may be an alkylene group having 1 to 10 carbon atoms or —$SiR^4R^5$—, $R^4$ and $R^5$ may each independently be an alkyl group having 1 to 10 carbon atoms, PO is an olefin-based polymer block, PS is an aromatic vinyl-based polymer block, and * is a portion connected in a repeating unit or a terminal of a repeating unit, wherein when * is a terminal of a repeating unit, * may be a functional group derived from hydrogen or an anionic polymerization initiator.

According to an embodiment of the present invention, the aromatic vinyl-based polymer block may be a block formed by the polymerization of an aromatic vinyl-based monomer, and the aromatic vinyl-based monomer for forming the aromatic vinyl-based polymer block may be one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene. A specific example thereof may be styrene.

According to an embodiment of the present invention, the content of the aromatic vinyl-based polymer block based on the total content of the block copolymer may be 10 wt % to 60 wt %, 15 wt % to 40 wt %, or 20 wt % to 35 wt %. Within this range, there is an effect in that the mechanical physical properties and processibility of the block copolymer are excellent.

According to an embodiment of the present invention, the olefin-based polymer block (i.e., poly(ethylene-co-olefin)) may include an ethylene monomer unit and an α-olefin-based monomer unit having 3 to 20 carbon atoms. Specific examples thereof may include an ethylene monomer unit and an α-olefin-based monomer unit having 6 to 8 carbon atoms. As described above, when the olefin-based polymer block includes an ethylene monomer unit and an α-olefin-based monomer unit having 3 to 20 carbon atoms or 6 to 8 carbon atoms, the weather resistance, heat resistance, abrasion resistance, impact resistance, adhesiveness, transparency, and recyclability of the block copolymer are excellent, and there is an effect of improving the mechanical physical properties of a resin composition including the block copolymer.

According to an embodiment of the present invention, an α-olefin-based monomer for forming the α-olefin-based monomer unit having 3 to 20 carbon atoms may be one or more selected from the group consisting of propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-icocene, 4,4-dimethyl-1-pentene, 4,4-diethyl-1-hexene, and 3,4-dimethyl-1-hexene.

According to an embodiment of the present invention, an α-olefin-based monomer for forming the α-olefin-based monomer unit having 6 to 8 carbon atoms may be one or more selected from the group consisting of 1-hexene, 4-methyl-1-pentene, 3-methyl-1-pentene, 1-heptene, 1-octene, 4,4-dimethyl-1-pentene, and 3,4-dimethyl-1-hexene. A specific example thereof may be 1-hexene.

According to an embodiment of the present invention, the content of the olefin-based polymer block based on the total content of the block copolymer may be 40 wt % to 90 wt %, 60 wt % to 85 wt %, or 65 wt % to 80 wt %. Within this range, there is an effect in that the mechanical physical properties and processibility of the block copolymer are excellent.

According to an embodiment of the present invention, when the olefin-based polymer block includes an ethylene monomer unit, the content of the ethylene monomer unit based on the total content of the block copolymer may be 20 wt % to 70 wt %, 30 wt % to 60 wt %, or 35 wt % to 50 wt %. Within this range, there is an effect in that the mechanical physical properties and processibility of the block copolymer are excellent.

According to an embodiment of the present invention, when the olefin-based polymer block includes an α-olefin-based monomer unit, the content of the α-olefin-based monomer unit based on the total content of the block copolymer may be 10 wt % to 50 wt %, 15 wt % to 45 wt %, or 20 wt % to 40 wt %. Within this range, there is an effect in that the mechanical physical properties and processibility of the block copolymer are excellent.

According to an embodiment of the present invention, the block copolymer may have a molecular weight distribution (Mw/Mn) of 1.2 or greater, 1.2 to 5.0, 1.5 to 4.0, 1.5 to 3.0, 1.5 to 2.5, or 1.6 to 2.2. Within this range, there is an effect in that the mechanical physical properties and processibility of the block copolymer are excellent. Here, the molecular weight distribution (Mw/Mn) may refer to a polydispersity index (PDI).

According to an embodiment of the present invention, the block copolymer may have a weight average molecular weight (Mw) of 20,000 g/mol to 1,000,000 g/mol, 30,000 g/mol to 800,000 g/mol, 40,000 g/mol to 500,000 g/mol, 50,000 g/mol to 400,000 g/mol, or 53,000 g/mol to 357,000 g/mol. Here, the weight average molecular weight may be measured using polystyrene (PS) standard gel permeation chromatography (GPC).

According to an embodiment of the present invention, the block copolymer may have a tensile strength of 5 MPa to 50 MPa, 6 MPa to 40 MPa, or 7 MPa to 35 MPa. Within this range, there is an effect of securing the mechanical physical properties of a resin composition including the block copolymer.

According to an embodiment of the present invention, the block copolymer may have an elongation at break of 1,000% to 3,000%, 1,200% to 2,800%, or 1,300% to 2,500%. Within this range, there is an effect of securing the mechanical physical properties of a resin composition including the block copolymer.

According to an embodiment of the present invention, a method for preparing the block copolymer includes (S10) polymerizing one or more olefin-based monomers using a transition metal catalyst in the presence of a chain transfer agent to prepare an olefin-based polymer block intermediate represented by Formula 4 below, (S20) introducing and polymerizing an anionic polymerization initiator and an aromatic vinyl-based monomer in the presence of the olefin-based polymer block intermediate represented by Formula 4 below prepared in Step (S10) to prepare a block copolymer intermediate represented by Formula 5 below, and (S30) obtaining a block copolymer including a repeating unit represented by Formula 6 below from the block copolymer intermediate represented by Formula 5 prepared in Step (S20), wherein the chain transfer agent includes an organozinc compound represented by Formula 1 below, and the chain transfer agent may not include a side reaction product other than the organozinc compound represented by Formula 1 below.

[Formula 1]

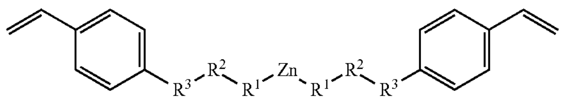

In Formula 1 above, $R^1$ and $R^3$ may each independently be a single bond or an alkylene group having 1 to 10 carbon atoms, $R^2$ may be an alkylene group having 1 to 10 carbon atoms or $-SiR^4R^5-$, and $R^4$ and $R^5$ may each independently be an alkyl group having 1 to 10 carbon atoms.

[Formula 4]

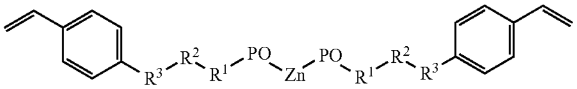

In Formula 4 above, $R^1$ and $R^3$ may each independently be a single bond or an alkylene group having 1 to 10 carbon atoms, $R^2$ may be an alkylene group having 1 to 10 carbon atoms or $-SiR^4R^5-$, $R^4$ and $R^5$ may each independently be an alkyl group having 1 to 10 carbon atoms, and PO may be an olefin-based polymer block.

[Formula 5]

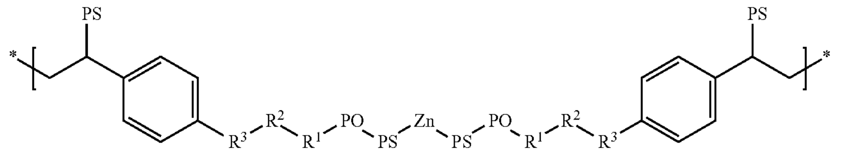

In Formula 5 above, $R^1$ and $R^3$ may each independently be a single bond or an alkylene group having 1 to 10 carbon atoms, $R^2$ may be an alkylene group having 1 to 10 carbon atoms or $—SiR^4R^5—$, $R^4$ and $R^5$ may each independently be an alkyl group having 1 to 10 carbon atoms, PO is an olefin-based polymer block, PS is an aromatic vinyl-based polymer block, and * is a portion connected in a repeating unit or a terminal of a repeating unit, wherein when * is a terminal of a repeating unit, * may be a functional group derived from hydrogen or an anionic polymerization initiator.

[Formula 6]

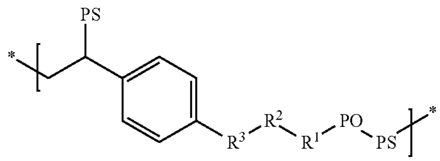

In Formula 6 above, $R^1$ and $R^3$ may each independently be a single bond or an alkylene group having 1 to 10 carbon atoms, $R^2$ may be an alkylene group having 1 to 10 carbon atoms or $—SiR^4R^5—$, $R^4$ and $R^5$ may each independently be an alkyl group having 1 to 10 carbon atoms, PO is an olefin-based polymer block, PS is an aromatic vinyl-based polymer block, and * is a portion connected in a repeating unit or a terminal of a repeating unit, wherein when * is a terminal of a repeating unit, * may be a functional group derived from hydrogen or an anionic polymerization initiator.

According to an embodiment of the present invention, Step (S10) above may be a step of growing an olefin-based polymer chain from a chain transfer agent including the organic zinc compound represented by Formula 1 above through coordinative chain transfer polymerization (CCTP) using a transition metal catalyst to prepare an olefin-based polymer block intermediate.

According to an embodiment of the present invention, the transition metal catalyst is a catalyst for growing an olefin-based polymer through coordinative chain transfer polymerization, and may be a catalyst composition including a transition metal catalyst as a main catalyst and a co-catalyst, wherein the co-catalyst may be an organoaluminum or a boron compound. As a specific example, the catalyst composition including the transition metal catalyst may be a homogeneous (metallocene) catalyst or a heterogeneous (Ziegler) catalyst, and more specifically, may be a homogeneous (metallocene) catalyst.

According to an embodiment of the present invention, the transition metal catalyst may be a pyridylamido hafnium complex activated with $[(C_{18}H_{37})_2N(H)Me]^+[B(C_6F_5)_4]^-$, in which case, there is an effect of preventing a polyolefin chain which is not bonded to the zinc of the chain transfer agent.

According to an embodiment of the present invention, the one or more olefin-based monomers may be the same as the olefin-based monomer for forming the olefin-based polymer block described above. Specific examples thereof may include one or more α-olefin-based monomers selected from the group consisting of an ethylene monomer and an α-olefin-based monomer having 3 to 20 carbon atoms. In addition, the olefin-based monomer may be introduced in a content for satisfying the content of the olefin-based polymer block described above.

According to an embodiment of the present invention, when one or more α-olefin-based monomers selected from the group consisting of an ethylene monomer and an α-olefin-based monomer having 3 to 20 carbon atoms are introduced as the olefin-based monomer, the ethylene monomer may be introduced in the form of a gaseous phase, and the α-olefin-based monomer having 3 to 20 carbon atoms may be introduced in the form of a gaseous or liquid phase.

According to an embodiment of the present invention, Step (S20) above may be a step of introducing and polymerizing an anionic polymerization initiator and an aromatic vinyl-based monomer in the presence of the olefin-based polymer block intermediate represented by Formula 4 above prepared in Step (S10) to initiate anionic polymerization from the Zn—C bonding site and styrene residues of the olefin-based polymer block intermediate represented by Formula 4 above, and to grow an aromatic vinyl-based monomer, thereby preparing a block copolymer intermediate represented by Formula 5 above. Here, Step (S20) above may be performed in one-pot with Step (S10).

According to an embodiment of the present invention, the anionic polymerization initiator may be an initiator composition including an organolithium compound, and a specific example thereof may be an initiator composition including an organolithium compound and a triamine compound.

According to an embodiment of the present invention, the organolithium compound may be one or more selected from the group consisting of n-butyllithium, sec-butyllithium, tert-butyllithium, methyllithium, ethyllithium, isopropyllithium, cyclohexyllithium, allyllithium, vinyllithium, phenyllithium, benzyllithium, pentylallylithium, and (trimethylsilyl)methyllithium. In this case, there is an effect in that anionic polymerization may be initiated from the Zn—C bonding site and styrene residues of an olefin-based polymer block intermediate and an aromatic vinyl-based monomer may be efficiently grown. In addition, the organolithium compound may be introduced in a molar ratio of 1:0.1 to 2.0, 1:0.5 to 1.5, or 1:0.8 to 1.2 based on the molar ratio of the chain transfer agent and the organolithium compound.

According to an embodiment of the present invention, the triamine compound is an additive for initiating anionic polymerization from the Zn—C bonding site and styrene residues of an olefin-based polymer block intermediate and efficiently growing an aromatic vinyl-based monomer, which has an effect of efficiently growing the aromatic vinyl-based monomer when included together with the organolithium compound in the initiator composition. As a specific example, the triamine compound may be N,N,N',N",N"-pentamethyldiethylenetriamine (PMDTA). In addition, the triamine compound may be introduced in a molar ratio of 0.5:1 to 1:1 based on the molar ratio of the organolithium compound and the triamine compound.

According to an embodiment of the present invention, the block copolymer intermediate represented by Formula 5 above prepared in Step (S20) above may be one in which a triblock copolymer of aromatic vinyl-based polymer block-olefin-based polymer block-aromatic vinyl-based polymer block is symmetrically formed around zinc.

According to an embodiment of the present invention, the aromatic vinyl-based monomer may be the same as the aromatic vinyl-based monomer for forming the aromatic vinyl-based polymer block described above. In addition, the aromatic vinyl-based monomer may be introduced in a content for satisfying the content of the aromatic vinyl-based polymer block described above.

According to an embodiment of the present invention, Step (S30) above may be a step of obtaining a block copolymer including a repeating unit represented by Formula 6 above from the block copolymer intermediate represented by Formula 5 above prepared in Step (S20), and may be performed by the reaction with water, oxygen or an organic acid. At this time, in the block copolymer symmetrically formed around zinc, the bond between zinc and the block copolymer bonded to the zinc may be broken, so that two block copolymers may be obtained. As a specific example, the organic acid may be ethylhexanoic acid.

According to an embodiment of the present invention, all steps and all reactions of the method for preparing a block copolymer may performed in an organic solvent, and the reaction temperature and reaction pressure may be adjusted as needed.

Resin Composition

The present invention provides a resin composition including the block copolymer.

According to an embodiment of the present invention, the resin composition may include the block copolymer and polypropylene, and as a specific example, may include the block copolymer, and polypropylene and/or a rubber polymer.

According to an embodiment of the present invention, the resin composition may include 5 wt % to 90 wt % of a block copolymer, 0 wt % to 95 wt % of polypropylene, and 0 wt % to 80 wt % of a rubber polymer, and as a specific example, may include 5 wt % to 90 wt %, 5 wt % to 70 wt %, 5 wt % to 50 wt %, or 10 wt % to 30 wt % of the block copolymer, 0 wt % to 95 wt %, 20 wt % to 90 wt %, 40 wt % to 90 wt %, or 70 wt % to 90 wt % of the polypropylene, and 0 wt % to 80 wt %, 0 wt % to 60 wt %, 0 wt % to 40 wt %, or 0 wt % to 20 wt % of the rubber polymer.

According to an embodiment of the present invention, the rubber polymer may be one or more selected from the group consisting of solution-polymerized styrene-butadiene rubber and ethylene-propylene rubber. Also, the resin composition may include a process oil.

According to an embodiment of the present invention, the resin composition may have a tensile strength of 15 MPa to 40 MPa, 20 MPa to 30 MPa, or 24 MPa to 28 MPa. Within this range, there is an effect in that the mechanical physical properties of the resin composition are excellent.

According to an embodiment of the present invention, the resin composition may have an elongation at break of 100% to 1,500%, 300% to 1,000%, or 390% to 980%. Within this range, there is an effect in that the mechanical physical properties of the resin composition are excellent.

According to an embodiment of the present invention, the resin composition may have an impact strength of greater than or equal to 5 kgf·m/m, greater than or equal to 7 kgf·m/m, or greater than or equal to 10 kgf·m/m. Within this range, there is an effect in that the mechanical physical properties of the resin composition are excellent.

According to an embodiment of the present invention, the resin composition may have a low-temperature (−40° C.) impact strength of greater than or equal to 4 kgf·m/m, greater than or equal to 4.5 kgf·m/m, or 4.5 kgf·m/m to 15.0 kgf·m/. Within this range, there is an effect in that the mechanical physical properties of the resin composition are excellent.

According to an embodiment of the present invention, the resin composition may have a melt flow index (230° C. and 2.16 kg) of greater than or equal to 10 g/10 min, greater than or equal to 11.8 g/10 min, or 11.8 g/10 min to 40.0 g/10 min. Within this range, there is an effect in that the processability of the resin composition are excellent.

According to an embodiment of the present invention, the resin composition may have a melt flow index (230° C. and 5 kg) of 0.5 g/10 min to 2.0 g/10 min, 0.7 to 1.5 g/10 min, or 0.95 to 1.00 g/10 min.

According to an embodiment of the present invention, the resin composition may have a melt flow index (230° C. and 10 kg) of greater than or equal to 5 g/10 min, greater than or equal to 6 g/10 min, or 6 g/10 min to 8 g/10 min.

According to an embodiment of the present invention, the resin composition may have a shore A hardness of 10 to 60, 30 to 50, or 45 to 50.

Hereinafter, embodiments of the present invention will be described in detail so that those skilled in the art may easily carry out the present invention. However, the present invention may be embodied in many different forms, and is not limited to the embodiments set forth herein.

PREPARATION EXAMPLES, EXAMPLES, COMPARATIVE EXAMPLES, AND EXPERIMENTAL EXAMPLES

In Preparation Examples, Examples, Comparative Examples and Experimental Examples, all operations were performed under an inert atmosphere using a standard glove box and Schlenk technique. Toluene, hexane, and diethyl ether were distilled from benzophenone ketyl. An ethylene/propylene gas mixture was purified on trioctylaluminum of 0.6 M in a mineral spirit in a bomb reactor of 2.0 L. $^{1}H$ NMR (600 MHz) and $^{13}C$ NMR (150 MHz) spectra were recorded using a JEOL ECZ 600 device. Gel Permeation Chromatography (GPC) was obtained on 1,2,4-trichlorobenzene at 160° C. using a HLC-8321 GPC/HT system equipped with an RI detector and two columns (PLgel mixed-B 7.5×300 mm of Varian Polymer Lab). All chlorine compounds containing styrene residues were filtered through a short alumina pad just prior to use to remove radical scavengers.

1: Preparation and Evaluation of Organozinc Compound

Preparation Example 1

10.0 g (60.0 mmol) of 4-(2-chloroethyl)styrene dissolved in a mixed solvent of 20 ml of toluene and 8.65 g (120 mmol) of tetrahydrofuran (THF) was added dropwise at room temperature to a suspension in which 2.19 g (90.0 mmol) of magnesium powder was stirred in 40 ml of toluene. After stirring was performed for 3.5 hour to generate slight heat, the reaction mixture was filtered on celite to remove magnesium added in excess. The filtrate was added to ethyl zinc methoxide (EtZn(OMe)) prepared by reacting 4.05 g (32.8 mmol) of diethyl zinc ($Et_2Zn$) and 1.05 g (32.8 mmol) of methanol in 30 ml of toluene in situ at room temperature for 1.0 hour. After stirring was performed at room temperature for 1.0 hour, 21.5 g of a mineral spirit (boiling point of 179° C. to 210° C.) was added, and magnesium chloride methoxide (MgCl(OMe)), which is an insoluble salt, was removed on celite. Thereafter, the toluene and the tetrahydrofuran were removed using a high vacuum line to obtain an organozinc compound represented by Formula 1-1 below as a mineral spirit solution. An aliquot was taken and the mineral spirit was completely removed by vacuum distillation at 70° C. under full vacuum. According to the result of weight measurement, the yield was 80 wt % (7.95 g), and $^{1}H$ NMR and $^{13}C$ NMR spectra were measured.

Meanwhile, methyl cyclohexane was added to the obtained organozinc compound represented by Formula 1-1 below to prepare a 10 wt % solution, which was later used for the polymerization in Examples.

[Formula 1-1]

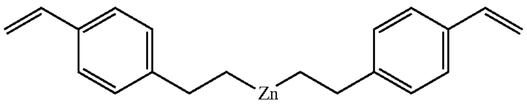

$^{1}H$ NMR ($C_6D_6$): δ 7.28 (d, J=8.4 Hz, 2H), 6.99 (d, J=8.4 Hz, 2H), 6.65 (dd, J=17, 11 Hz 1H, =CH), 5.65 (d, J=17 Hz, 1H, =$CH_2$), 5.08 (d, J=11 Hz, 1H, =$CH_2$), 2.62 (t, J=7.2 Hz, 2H, $CH_2$), 0.42 (t, J=7.2 Hz, 2H, $ZnCH_2$) ppm.

$^{13}C$ NMR ($C_6D_6$): δ 18.88, 32.76, 112.73, 127.06, 127.99, 135.40, 137.30, 148.60 ppm.

Preparation Example 2

5.00 g (32.8 mmol) of 4-vinylbenzyl chloride dissolved in 10 ml of diethyl ether was added dropwise at 0° C. to a suspension in which 0.876 g (36.0 mmol) of magnesium metal was stirred in 20 ml of diethyl ether. After stirring was performed for 1.0 hour while cooling was performed in an ice bath, the reaction mixture was filtered on celite to remove magnesium added in excess. The generated Grignard reagent was added to ethyl zinc methoxide (EtZn (OMe)) prepared by reacting 4.05 g (32.8 mmol) of diethyl zinc ($Et_2Zn$) and 1.05 g (32.8 mmol) of methanol in 30 ml of toluene in situ at room temperature for 1.0 hour. After stirring was performed at room temperature for 1.0 hour, magnesium chloride methoxide (MgCl(OMe)), which is an insoluble salt, was removed on celite. The filtered filter cake was washed using 20 ml of diethyl ether. Thereafter, the solvent was removed using a high vacuum line, and an oily compound was obtained. 14 g of toluene was added to the obtained oily compound, and a volatile material including toluene and diethyl zinc temporarily generated was completely removed using a high vacuum line, and 4.35 g of a pale yellow solid was obtained. The obtained solid was dissolved in 44 g of hot methyl cyclohexane, and filtered in a hot state to remove an insoluble portion. The filtrate was stored at −35° C. to precipitate a compound represented by Formula 1-2 below as a pale yellow solid. According to the result of weight measurement, the yield was 81 wt % (3.79 g), and $^{1}H$ NMR and $^{13}C$ NMR spectra were measured.

[Formula 1-2]

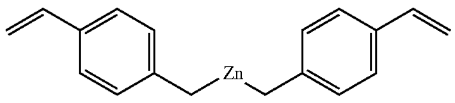

$^{1}H$ NMR ($C_6D_6$): δ 7.24 (d, J=8.4 Hz, 2H), 6.81 (d, J=8.4 Hz, 2H), 6.66 (dd, J=18, 10 Hz, 1H, =CH), 5.64 (d, J=18 Hz, 1H, =$CH_2$), 5.06 (d, J=10 Hz, 1H, =$CH_2$), 1.50 (s, 2H, $CH_2Zn$) ppm.

$^{13}C$ NMR ($C_6D_6$): δ 23.92, 111.30, 127.04, 127.51, 132.46, 137.48, 144.90 ppm.

Preparation Example 3

10.00 g (65.5 mmol) of 4-vinylbenzyl chloride dissolved in 20 ml of diethyl ether was added dropwise at 0° C. to a suspension in which 1.752 g (72.0 mmol) of magnesium metal was stirred in 40 ml of diethyl ether. After stirring was performed for 1.0 hour while cooling was performed in an ice bath, the reaction mixture was filtered on celite to remove magnesium added in excess. 9.38 g (65.5 mmol) of chloro(chloromethyl)dimethylsilane was added dropwise at room temperature to the generated 4-vinylbenzyl-magnesium chloride (4-vinylbenzyl-MgCl) Grignard reagent. After stirring was performed for 2.5 hours, 30 ml of water was added, and an organic phase was obtained. In addition, a product was further extracted from a water phase over 3 times with 20 ml of hexane. The obtained organic phase and the product extracted from the water phase were added together, and dried with anhydrous magnesium sulfate ($MgSO_4$). Thereafter, the solution was filtered through a short silica gel pad, and the solvent was removed using a rotary evaporator to obtain a compound represented by Formula 3-3-1 below as a yellow oil. According to the result of weight measurement, the yield was 79 wt % (11.6 g), and $^{1}H$ NMR and $^{13}O$ NMR spectra were measured.

[Formula 3-3-1]

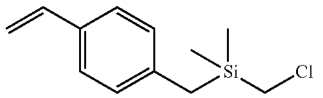

$^{1}H$ NMR ($C_6D_6$): δ 7.19 (d, J=8.4 Hz, 2H), 6.83 (d, J=8.4 Hz, 2H), 6.61 (dd, J=17, 12 Hz, 1H, =CH), 5.63 (d, J=17 Hz, 1H, =$CH_2$), 5.08 (d, J=12 Hz, 1H, =$CH_2$), 2.43 (s, 2H, $CH_2Cl$), 1.97 (s, 2H, $CH_2Si$), −0.086 (s, 3H, $CH_3Si$) ppm.

$^{13}C$ NMR ($C_6D_6$): δ −5.02, 23.45, 29.34, 112.42, 126.79, 128.51, 134.45, 137.20, 138.96 ppm.

Thereafter, 5.00 g (22.2 mmol) of the compound represented by Formula 3-3-1 prepared above was dissolved in 10 ml of diethyl ether, and was added dropwise at 0° C. to a suspension in which 0.59 g (24.5 mmol) of magnesium metal was stirred in 20 ml of diethyl ether. After stirring was performed for 1.0 hour while cooling was performed in an ice bath, the reaction mixture was filtered on celite to remove magnesium added in excess. The generated Grignard reagent was added to ethyl zinc methoxide (EtZn (OMe)) prepared by reacting 2.75 g (22.2 mmol) of diethyl zinc ($Et_2Zn$) and 0.71 g (22.2 mmol) of methanol in 30 ml of toluene in situ at room temperature for 1.0 hour. After stirring was performed at room temperature for 1.0 hour, magnesium chloride methoxide (MgCl(OMe)), which is an insoluble salt, was removed on celite. The filtered filter cake was washed using 20 ml of diethyl ether. Thereafter, the solvent was removed using a high vacuum line, and an oily compound was obtained. 14 g of toluene was added to the obtained oily compound, and a volatile material including toluene and diethyl zinc temporarily generated was completely removed using a high vacuum line, and a solid was obtained. The obtained solid was dissolved in 100 g of hexane, stored at −30° C. to precipitate a compound represented by Formula 1-3 below as a solid. According to the result of weight measurement, the yield was 58 wt % (2.86 g), and $^{1}H$ NMR and $^{13}C$ NMR spectra were measured.

[Formula 1-3]

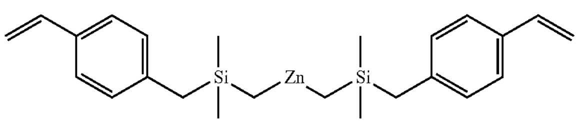

$^{1}H$ NMR ($C_6D_6$): δ 7.21 (d, J=7.8 Hz, 2H), 6.81 (d, J=7.8 Hz, 2H), 6.63 (dd, J=18, 11 Hz, 1H, =CH), 5.63 (d, J=18 Hz, 1H, =$CH_2$), 5.09 (d, J=11 Hz, 1H, =$CH_2$), 1.93 (s, 2H, $CH_2$), 0.03 (s, 6H, $Si(CH_3)_2$), −1.04 (s, 2H, $CH_2Zn$) ppm.

$^{13}C$ NMR ($C_6D_6$): δ −1.30, 1.27, 28.94, 112.26, 127.23, 128.31, 134.13, 137.24, 141.81 ppm.

Preparation Example 4

To 78 ml of diethyl ether, 15.0 g (98.3 mmol) of 4-vinylbenzyl chloride and 2.628 g (108.1 mmol) of magnesium metal were added, and the mixture was stirred at 0° C. for 1.0 hour, followed filtration on celite to remove magnesium added in excess. 19.2 g (81.9 mml) of p-tosyl-$OCH_2CH_2Cl$ dissolved in 27 ml of diethyl ether was added dropwise to the generated 4-vinylbenzyl-magnesium chloride (4-vinylbenzyl-MgCl) Grignard reagent. Stirring was performed overnight, and filtration was performed on celite to remove magnesium chloride tosylate (MgCl(OTs)), which is an insoluble salt. The filtered filter cake was washed over 3 times with 70 ml of hexane, and the solvent was removed using a rotary evaporator to obtain 14.2 g of a crude product. 43 mg (3,000 ppm) of t-butylcatechol was added as a radical scavenger, and vacuum distillation was performed at 85° C. under full vacuum to obtain a compound represented by Formula 3-4-1 below. According to the result of weight measurement of the obtained compound, the yield was 81 wt % (12.0 g), and $^{1}H$ NMR and $^{13}O$ NMR spectra were measured.

[Formula 3-4-1]

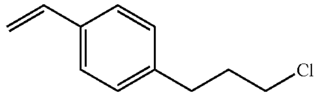

$^{1}H$ NMR ($C_6D_6$): δ 7.20 (d, J=8.4 Hz, 2H), 6.88 (d, J=8.4 Hz, 2H), 6.61 (dd, J=16, 9.6 Hz, 1H, =CH), 5.63 (d, J=16 Hz, 1H, =$CH_2$), 5.09 (d, J=9.6 Hz, 1H, =$CH_2$), 3.04 (t, J=6.6 Hz, 2H, $CH_2$), 2.42 (t, J=6.6 Hz, 2H, $CH_2$), 1.64 (quintet, J=6.6 Hz, 2H, $CH_2Cl$) ppm.

$^{13}C$ NMR ($C_6D_6$): δ 32.61, 34.12, 44.07, 113.13, 126.74, 128.97, 135.99, 137.11, 140.63 ppm.

Thereafter, 10.0 g (55.3 mmol) of the compound (4-(3-chloropropyl)styrene) represented by Formula 3-4-1 prepared above was dissolved in a mixed solvent of 20 ml of toluene and 7.98 g (111 mmol) of tetrahydrofuran (THF), and then added dropwise at room temperature to a suspension in which 2.02 g (83.0 mmol) of magnesium powder was stirred in 40 ml of toluene. After stirring was performed for 5.0 hours to generate slight heat, the reaction mixture was filtered on celite to remove magnesium added in excess. 6.94 g (55.3 mmol, 1 equivalent based on a Grignard reagent) of ethyl zinc methoxide (EtZn(OMe)) prepared by reacting 6.83 g (55.3 mmol) of diethyl zinc ($Et_2Zn$) and 1.78 g (55.3 mmol) of methanol in 30 ml of toluene in situ at room temperature for 1.0 hour was added to the filtrate. Thereafter, 60 ml of toluene was added, stirred at room temperature for 1.0 hour, and then the solvent was removed using a high vacuum line. Thereafter, 96 g of hexane was added, and magnesium chloride methoxide (MgCl(OMe)), which is an insoluble salt, was removed on celite. The filtrate was stored at −30° C. to deposit the compound represented by Formula 1-4 as a white crystalline solid. According to the result of weight measurement, the yield was 56 wt % (7.28 g), and 1H NMR and $^{13}C$ NMR spectra were measured.

[Formula 1-4]

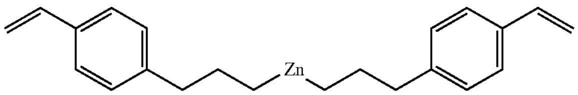

$^{1}H$ NMR ($C_6D_6$): δ 7.24 (d, J=7.8 Hz, 2H), 6.90 (d, J=7.8 Hz, 2H), 6.64 (dd, J=17, 11 Hz, 1H, =CH), 5.66 (d, J=17 Hz, 1H, =$CH_2$), 5.11 (d, J=11 Hz, 1H, =$CH_2$), 2.43 (t, J=7.2 Hz, 2H, $CH_2$), 1.80 (quintet, J=7.2 Hz, 2H, $CH_2$), −0.19 (t, J=7.2 Hz, 2H, $CH_2Zn$) ppm.

$^{13}C$ NMR ($C_6D_6$): δ 12.66, 28.82, 40.09, 113.15, 127.31, 129.23, 136.05, 137.10, 142.91 ppm

Comparative Preparation Example 1

Borane dimethyl sulfide (1.6 mL, 3.2 mmol) was slowly introduced to triethylborane (0.6 g) in stirring and then reacted for 90 minutes. The mixture was slowly introduced to divinylbenzene (3.8 g) dissolved in anhydrous diethylether (10 mL) cooled to −20° C. and then stirred overnight. A solvent was removed with a vacuum pump and then diethyl zinc (0.8 g) was added. The reaction was performed at 0° C. for 5 hours while removing triethylborane generated through distillation under reduced pressure. At 40° C., excess divinylbenzene and diethylzinc were removed by distillation under reduced pressure. Methylcyclohexane (150 mL) was added to dissolve a product again, and then a solid compound produced as a by-product was filtered using celite and removed to prepare an organozinc compound represented by Formula 1-1 above.

Comparative Preparation Example 2

The organozinc compound represented by Formula 1-1 above was prepared in the same manner as in Preparation Example 1, except that zinc chloride ($ZnCl_2$) was used instead of ethyl zinc methoxide (EtZn(OMe)) in Preparation Example 1.

Experimental Example 1: Evaluation of Organozinc Compound

For the organozinc compounds prepared in Preparation Examples 1 to 4 and Comparative Preparation Examples 1 and 2, the content (purity) of a target organozinc compound and the content of alkyl zinc chloride (R—Zn—Cl) and a borane-based compound (triethyl borane or diethyl borane hydride) acting as catalyst poisons were measured.

Measurement of content of each component 1H (500 MHz) NMR spectra were taken and analyzed using a Varian 500 MHz spectrometer. Shift was shown in ppm in the downfield from TMS using the residual solvent peak as a reference, and the ratio was calculated.

1) Target compound:

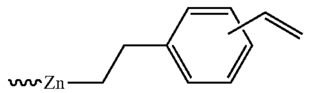

2) Terminal saturated compound:

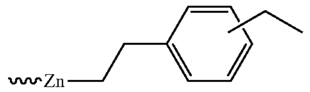

3) Side reaction product:

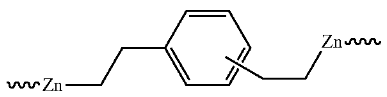

Measurement of chlorine content: The measurement was performed under the following conditions and methods through combustion IC (ICS-2000/AQF-2100H).

1) Combustion temperature: Inlet temperature 900° C., Outlet temperature 1,000° C.

2) Gas flow rate: Ar gas 200 mL/min, $O_2$ gas 400 mL/min

3) Humidification amount: 0.23 mL/min, Internal standard material ($PO4_3^-$): 20 mg/kg 4) Absorbent ($H_2O_2$): 900 mg/kg, Volume of absorbent liquid: 5 mL, Final dilution volume: 17 mL 5) Column: IonPac AS18 (4×250 mm)

6) Type of eluent: KOH (30.5 mM), Eluent flow rate: 1 mL/min

7) Detector: Suppressed Conductivity Detector, SRS Current: 76 mA

8) Injection volume: 100 μL, Isocratic/Gradient condition: Isocratic

9) About 0.005 g of a sample was accurately measured in a sample boat, and a comburent ($WO_3$) was added to measure the sample by combustion IC.

TABLE 1

| Content | Preparation Example 1 | Preparation Example 2 | Preparation Example 3 | Preparation Example 4 | Comparative Preparation Example 1 | Comparative Preparation Example 2 |
|---|---|---|---|---|---|---|
| Target compound (mol %) | >99 | >99 | >99 | >99 | 82.40 | 95 |
| Terminal saturated compound (mol %) | 0 | 0 | 0 | 0 | 9.15 | 5 |
| Side reaction product (mol %) | 0 | 0 | 0 | 0 | 8.40 | 0 |
| Borane-based compound (mol %) | 0 | 0 | 0 | 0 | 0.05 | 0 |
| Chlorine (ppm) | 0 | 0 | 0 | 0 | — | 1,000 |

Referring to Table 1 above, it was confirmed that most of Preparation Examples 1 to 4 were target compounds and there was no terminal-saturated zinc compound or side reaction product. However, Comparative Preparation Example 1 had about 20 mol % of terminal-saturated zinc compounds and side reaction products. A terminal-saturated compound cannot cause anionic polymerization, thereby having a problem of increasing the content of a diblock copolymer in a polymer to be finally produced. A side reaction product is an intermediate which is converted into a compound in the form of an oligomer of a dimer or more, and when such an organozinc compound in the form of such an oligomer is present, a chain transfer reaction cannot be induced due to the increase in viscosity, so that there is a problem in that the synthesis reaction into a polymer is inhibited. That is, it can be seen that the organozinc compound of Comparative Preparation Example 1 has the above problem.

In addition, although the ratio of target compounds in Comparative Preparation Example 2 is high, there is as much as 1,000 ppm of chlorine included which may act as a catalyst poison, and compared to the ratio of target compounds of Preparation Examples 1 to 4, the ratio of target compounds of Comparative Preparation Example 2 is relatively low. Therefore, it can be sufficiently inferred that the organic zinc compounds of Preparation Examples 1 to 4 are improved.

2. Preparation and Evaluation of Polyolefin-Polystyrene-Based Block Copolymer

Examples 1-1 to 1-4

To a Parr reactor of 3.7 L, 1,200 g of methylcyclohexane in which 1.0 mmol-Al of modified methylaluminoxane-3A (MMAO-3A) was dissolved was introduced, followed by stirring at 90° C. for 30 minutes using a heating mantle. The solution was removed using a cannula, and to the reactor in an inert atmosphere, 1,200 g of methylcyclohexane, 560 g of 1-hexene, and a solution in which 3.50 mmol of the compound prepared in Preparation Example 1 above was dissolved in 1.00 mmol-Al (radical scavenger) of methylaluminoxane-3A (MMAO-3A) and methylcyclohexane were introduced. The temperature of the solution was set to 90° C. Thereafter, using a syringe, a catalyst solution containing 10.0 μmol of a pyridylamido hafnium complex activated with 10.0 μmol of $[(C_{18}H_{37})_2N(H)Me]^+[B(C_6F_5)_4]^-$ in methylcyclohexane was injected into the reactor. After the injection of the catalyst, ethylene gas was immediately introduced at a pressure of 25 bar, and the pressure of 25 bar was maintained constant during the supply. Although cooling was performed by an inner coil, the temperature was increased to 115° C. within 5 minutes due to an exothermic reaction. After the initial temperature increase, the temperature started to slowly decrease due to catalyst deactivation, and was maintained at 90° C. After polymerization was performed for 40 minutes, the ethylene gas was exhausted. Thereafter, a solution in which 3.10 mmol of pentylallyllithium (PMDTA) was dissolved in methylcyclohexane was added, and the mixture was stirred for 30 minutes while maintaining the temperature at 90° C., followed by introducing 100 g of styrene. While controlling the temperature of the solution to 100° C., the reactor was left to stand overnight for the complete conversion of the styrene. 2-ethylhexanoic acid was added as a quenching agent, and after opening the reactor, an excess of ethanol was added to the solution. Thereafter, the precipitated polymer mass was dried overnight in a vacuum oven at 80° C. to obtain 350 g of the polymer mass.

Example 1-5

To a Parr reactor of 3.7 L, 1,200 g of methylcyclohexane in which 1.0 mmol-Al of modified methylaluminoxane-3A (MMAO-3A) was dissolved was introduced, followed by stirring at 90° C. for 30 minutes using a heating mantle. The solution was removed using a cannula, and to the reactor in an inert atmosphere, 1,200 g of methylcyclohexane, 560 g of 1-hexene, and a solution in which 3.50 mmol of the compound prepared in Preparation Example 4 above was dissolved in 1.00 mmol-Al (radical scavenger) of methylaluminoxane-3A (MMAO-3A) and methylcyclohexane were introduced. The temperature of the solution was set to 90° C. Thereafter, using a syringe, a catalyst solution containing 10.0 μmol of a pyridylamido hafnium complex activated with 10.0 μmol of $[(C_{18}H_{37})_2N(H)Me]^+[B(C_6F_5)_4]^-$ in methylcyclohexane was injected into the reactor. After the injection of the catalyst, ethylene gas was immediately introduced at a pressure of 25 bar, and the pressure of 25 bar was maintained constant during the supply. Although cooling was performed by an inner coil, the temperature was increased to 115° C. within 5 minutes due to an exothermic reaction. After the initial temperature increase, the temperature started to slowly decrease due to catalyst deactivation, and was maintained at 90° C. After polymerization was performed for 40 minutes, the ethylene gas was exhausted. Thereafter, a solution in which 3.10 mmol of pentylallyllithium (PMDTA) was dissolved in methylcyclohexane was added, and the mixture was stirred for 30 minutes while maintaining the temperature at 90° C., followed by introducing 100 g of styrene. While controlling the temperature of the solution to 100° C., the reactor was left to stand overnight for the complete conversion of the styrene. 2-ethylhexanoic acid was added as a quenching agent, and after opening the reactor, an excess of ethanol was added to the solution. Thereafter, the precipitated polymer mass was dried overnight in a vacuum oven at 80° C. to obtain 350 g of the polymer mass.

Comparative Example 1-1

A polymer was prepared in the same manner as in Example 1-1, except that the organozinc compound of Comparative Preparation Example 1 was used instead of the organozinc compound of Preparation Example 1 in Example 1-1.

Comparative Example 1-2

A polymer was prepared in the same manner as in Example 1-1, except that the organozinc compound of Comparative Preparation Example 2 was used instead of the organozinc compound of Preparation Example 1 in Example 1-1.

Comparative Example 1-3

A polymer was prepared in the same manner as in Example 1-1, except that dihexyl zinc was used instead of the organozinc compound of Preparation Example 1 in Example 1-1.

Comparative Example 1-4

A commercially available SEBS (Kraton G1651) was prepared.

Experimental Example 2: Evaluation of Block Copolymer 1

For the block copolymers prepared by coordinative chain transfer polymerization (CCTP) and anionic polymerization according to Examples 1-1 to 1-5 and Comparative Examples 1-2 to 1-4 and the block copolymer of Comparative Example 1-1, the content of an ethylene unit, content of a hexene unit, content of a styrene unit, weight average molecular weight, tensile strength and elongation at break were measured by the following method and the results are shown in Table 2 below.

Contents (wt %) of ethylene, hexene (or butene) and styrene units: The content of each monomer unit was measured using the 1H NMR spectrum.

Number average molecular weight (Mn, g/mol), weight average molecular weight (Mw g/mol) and molecular weight distribution (Mw/Mn): The number average molecular weight and the weight average molecular weight were measured using polystyrene (PS) standard gel permeation chromatography (GPC). Gel Permeation Chromatography (GPC) was obtained on 1,2,4-trichlorobenzene at 160° C. using a HLC-8321 GPC/HT system equipped with an RI detector and two columns (PLgel mixed-B 7.5×300 mm of Varian Polymer Lab). The measured number average molecular weight and weight average molecular weight were converted into equivalent values of SEBS by universal calibration.

Tensile strength (MPa) and elongation at break (%): In accordance with ASTM D638, the block copolymers of Examples 1-1 to 1-5 and Comparative Examples 1-1 to 1-4 prepared above were compressed between hot plates at 140° C. (240° C. for Comparative Example 1-4) for 10 minutes at 25 bar and for 30 minutes at 75 bar. Thereafter, the obtained polymer film having a thickness of about 1 mm was cut into a dog bone shape, and the tensile strength and elongation at break thereof were measured using UTM according to the ISO-37 standard measurement method.

TABLE 2

| | Examples | | | | | Comparative Examples | | | |
|---|---|---|---|---|---|---|---|---|---|
| Classification | 1-1 | 1-2 | 1-3 | 1-4 | 1-5 | 1-1 | 1-2 | 1-3 | 1-4 |
| Organozinc compound | Preparation Example 1 | Preparation Example 1 | Preparation Example 1 | Preparation Example 4 | Preparation Example 4 | Comparative Preparation Example 1 | Comparative Preparation Example 2 | $(Hexyl)_2$ Zn | — |
| Content of ethylene unit (wt %) | 44.9 | 41.4 | 43.6 | 41.1 | 43.6 | 48.7 | 41.7 | 43.9 | 43.4 |
| Content of hexene(or butene) unit (wt %) | 30.4 | 36.6 | 23.7 | 33.2 | 31.9 | 24.8 | 32.3 | 27.4 | 24.8 |
| Content of styrene unit (wt %) | 25.0 | 22.1 | 32.6 | 25.7 | 24.5 | 26.5 | 26.0 | 28.7 | 31.8 |
| Mw($\times10^3$ g/mol) | 146 | 192 | 250 | 178 | 161 | 89 | 146 | 167 | 139 |
| Mw/Mn | 1.7 | 1.8 | 2.1 | 2.2 | 1.8 | 1.9 | 1.8 | 1.5 | 1.1 |
| Tensile strength (MPa) | 22 | 18 | 35 | 20 | 23 | 19 | 15 | 10 | 29 |
| Elongation at break (%) | 1,700 | 2,500 | 1,300 | 2,200 | 1,900 | 1,700 | 1,600 | 3,000 | 2,000 |

As shown in Table 2, the block copolymers prepared in Examples 1-1 to 1-5 showed a wider molecular weight distribution than the block copolymer of Comparative Example 1-4, and thus, were confirmed to have excellent processability.

In addition, from Examples 1-1 to 1-3, it was confirmed that the tensile strength and elongation at break were changed according to the content of each monomer unit.

In addition, it was confirmed that while the block copolymer according to Example 1-5 were able to be synthesized on a large scale, it still exhibited physical properties equivalent to those of the block copolymer of Comparative Example 1-4. Particularly, the block copolymer according to Example 1-5 had a viscosity of 955 Pa-s measured with 500 rad/s at 160° C. using a rotary rheometer, but the viscosity of the block copolymer of Comparative Example 1-4 could not be measured.

Meanwhile, GPC curves of the polymer (i.e., poly(ethylene-co-1-hexene)) according to chain transfer coordinative polymerization and the block copolymer according to anionic polymerization during the polymerization of a block copolymer in accordance with Examples 1 to 5 are shown in FIG. 1, and from FIG. 1, it was clearly confirmed that a block copolymer was generated by the shift of the GPC curve after the styrene polymerization by anionic polymerization.

Experimental Example 3: Evaluation of Block Copolymer 2

Figure 2:
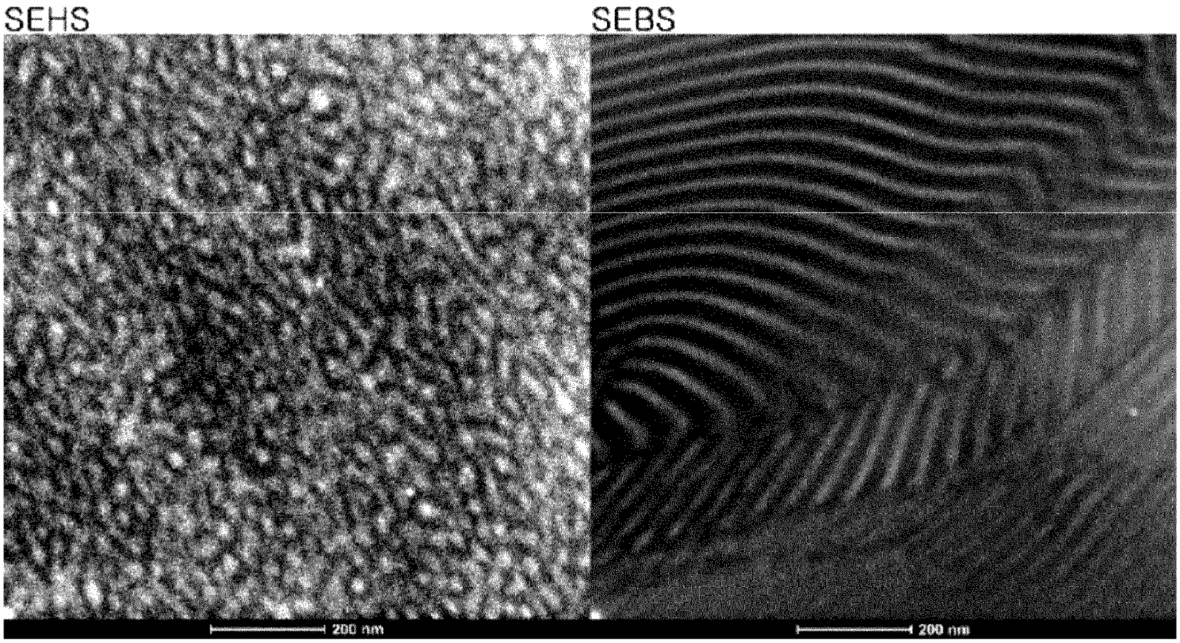
FIG. 2 is TEM photographs of block copolymers (SEHS) according to Examples 1 to 5 and block copolymers (SEBS) of Comparative Examples 1 to 4 of the present invention.

The block copolymer (SEHS) prepared according to Example 1-5 and the block copolymer (SEBS) of Comparative Example 1-4 were each photographed by TEM, and the TEM photographs are shown in FIG. 2.

Specifically, the block copolymer of Example 1-5 and the block copolymer of Comparative Example 1-4 were dissolved in toluene at 100° C. to 10 wt %, and the solution was poured into a frame. The solvent was slowly evaporated at room temperature for 5 days, and then was vacuumed overnight at 80° C. Before being dyed with $RuO_4$, the prepared specimen was annealed in an oven at 150° C. for 6 hours, and then photographed with TEM.

From FIG. 2, it was confirmed that the block copolymer (SEBS) of Comparative Example 1-4 showed an aligned lamellar structure, whereas the block copolymer (SEHS) prepared according to Examples 1-5 formed a disordered spherical structure, from which it was confirmed that there was a difference in polydispersity.

3. Preparation and Evaluation of Resin Composition 1

Examples 2-1 to 2-4 and Comparative Examples 2-1 to 2-3

On a xylene at 180° C., the block copolymer prepared in each of Examples 1-1 to 1-4 and Comparative Examples 1-1 to 1-3 was mixed with polypropylene (product name CB5230) in the ratio set forth in Table 3 below to prepare a resin composition.

Tensile strength (MPa) and elongation at break (%): In accordance with ASTM D638, the resin compositions of Examples and Comparative Examples prepared above were compressed between hot plates at 140° C. (240° C. for Comparative Example 1-4) for 10 minutes at 25 bar and for 30 minutes at 75 bar. Thereafter, the obtained resin composition film having a thickness of about 1 mm was cut into a dog bone shape, and the tensile strength and elongation at break thereof were measured using UTM according to the ISO-37 standard measurement method.

Room temperature (23±2° C.) and low-temperature (−40° C.) impact strength (Izod impact strength, kgf·m/m): On a xylene at 180° C., the block copolymer of each of Examples and Comparative Examples was mixed with polypropylene (product name CB5230) in the ratio set forth in Table 3 below, and then precipitated in ethanol to recover a resin composition from the solution. The recovered resin composition was dried in a vacuum oven, and then injected into a mold at 210° C. for 10 seconds at a pressure of 6 bar to be molded into a notched type shape having a size of 63.5 mm*10.16 mm 3.2 mm in accordance with ASTM D256. In accordance with ASTM D256, using the Izod impact machine model 104 of Tinius olsen Corporation, a pendulum of a 0.944 kg load was weighed from the prepared specimen to measure impact strength at room temperature (23±2° C.) and a low temperature (−40° C.). The low-temperature (−40° C.) impact strength was measured by placing the prepared specimen in a low-temperature chamber set at −40° C., exposing the specimen at −40° C. for 12 hours or more, and then taking the specimen out from the low-temperature chamber to measure the impact strength within 3 seconds.

Melt flow index (g/10 min): In accordance with ASTM D1238, using the MI-4 model of GOTTFERT Corporation, the resin compositions of Examples and Comparative Examples prepared above were filled in a feeding part, and then melted at 230° C. for 5 minutes before performing the measurement at 230° C. and a load of 2.16 kg.

TABLE 3

| | Examples | | | | Comparative Examples | | |
|---|---|---|---|---|---|---|---|
| Classification | 2-1 | 2-2 | 2-3 | 2-4 | 2-1 | 2-2 | 2-3 |
| PP content (wt %) | 80 | 80 | 80 | 80 | 80 | 80 | 80 |
| SEHS(or SEBS) content (wt %) | 20 | 20 | 20 | 20 | 20 | 20 | 20 |
| Tensile strength (MPa) | 27 | 26 | 28 | 26 | 17 | 14 | 6 |
| Elongation at break (%) | 800 | 1,000 | 800 | 1,000 | 700 | 800 | 1,100 |
| Room temperature impact strength (kgf · m/m) | N.B. | N.B. | N.B. | N.B. | 14 | 19 | 10 |
| Low-temperature impact strength (kgf · m/m) | 8.1 | 8.8 | 7.5 | 9.2 | 4.9 | 5.4 | 3.2 |
| Melt flow index (g/10 min) | 25 | 16 | 22 | 18 | 26 | 22 | 20 |

* N.B.: Not Broken

Referring to Table 3 above, Examples 2-1 to 2-4 were confirmed to have significantly excellent tensile strength as well as room temperature and low-temperature impact strength compared to Comparative Examples 2-1 to 2-3, and were also confirmed to have maintained an equivalent level or higher of elongation at break and melt flow index. Through the above, it can be seen that when a block copolymer prepared through the organozinc compound according to the present invention is applied, the performance of a resin composition (compound) may also be greatly improved.

4. Preparation and Evaluation of Resin Composition 2

Examples 2-5 to 2-7 and Comparative Examples 2-4 to 2-6

On a xylene at 180° C., the block copolymer prepared in Example 1-5 and the block copolymer of Comparative Example 1-4 were mixed with polypropylene (product name CB5230) in the ratio set forth in Tables 4 to 6 below to prepare a resin composition.

Experimental Example 4: Performance Evaluation of Resin Composition 1

For the resin compositions prepared according to Examples 2-5 to 2-7 and the resin compositions prepared according to Comparative Examples 2-4 to 2-6, physical properties were measured in the following manner, and the results are shown in Tables 4 to 6 below.

Tensile strength (MPa) and elongation at break (%): In accordance with ASTM D638, the resin compositions of Examples 2-5 to 2-7 and Comparative Examples 2-4 to 2-6 prepared above were each compressed between hot plates at 140° C. and 240° C. for 10 minutes at 25 bar and for 30 minutes at 75 bar. Thereafter, the obtained resin composition film having a thickness of about 1 mm was cut into a dog bone shape, and the tensile strength and elongation at break thereof were measured using UTM according to the ISO-37 standard measurement method.

Room temperature impact strength, low temperature impact strength, and melt flow index: Measured in the same manner as in Experimental Example 3 above.

TABLE 4

| Classification | Examples 2-5 | Comparative Examples 2-4 |
|---|---|---|
| PP content (wt %) | 90 | 90 |
| SEHS(or SEBS) content (wt %) | 10 | 10 |
| Tensile strength (MPa) | 24.0 | 24.7 |
| Elongation at break (%) | 390 | 390 |
| Room temperature impact strength (kgf · m/m) | 10.2 | 7.7 |
| Low-temperature impact strength (kgf · m/m) | 4.5 | 3.7 |
| Melt flow index (g/10 min) | 35.7 | 34.4 |

TABLE 5

| Classification | Examples 2-6 | Comparative Examples 2-5 |
|---|---|---|
| PP content (wt %) | 80 | 80 |
| SEHS(or SEBS) content (wt %) | 20 | 20 |
| Tensile strength (MPa) | 27.2 | 26.9 |
| Elongation at break (%) | 880 | 930 |
| Room temperature impact strength (kgf · m/m) | N.B. | 17.9 |
| Low-temperature impact strength (kgf · m/m) | 8.9 | 5.6 |
| Melt flow index (g/10 min) | 22.7 | 16.9 |

TABLE 6

| Classification | Examples 2-7 | Comparative Examples 2-6 |
|---|---|---|
| PP content (wt %) | 70 | 70 |
| SEHS(or SEBS) content (wt %) | 30 | 30 |
| Tensile strength (MPa) | 26.5 | 26.5 |
| Elongation at break (%) | 980 | 930 |
| Room temperature impact strength (kgf · m/m) | N.B. | N.B. |
| Low-temperature impact strength (kgf · m/m) | 13.6 | 8.5 |
| Melt flow index (g/10 min) | 11.8 | 10.4 |

* N.B.: Not Broken

As shown in Tables 4 to 6, when respectively comparing Examples 2-5 and Comparative Examples 2-4, Example 2-6 and Comparative Example 2-5, and Example 2-7 and Comparative Example 2-6 in which the block copolymer was introduced in that same content, it was confirmed that Examples prepared using the organozinc compound according to the present invention were excellent in all mechanical physical properties compared to Comparative Examples. The above difference in mechanical physical properties is due to the difference in co-monomer of the olefin-based polymer block, which is the intermediate block of the block copolymer, and the high molecular weight distribution of the block copolymer.

Experimental Example 5: Performance Evaluation of Resin Composition 2

Figure 3:
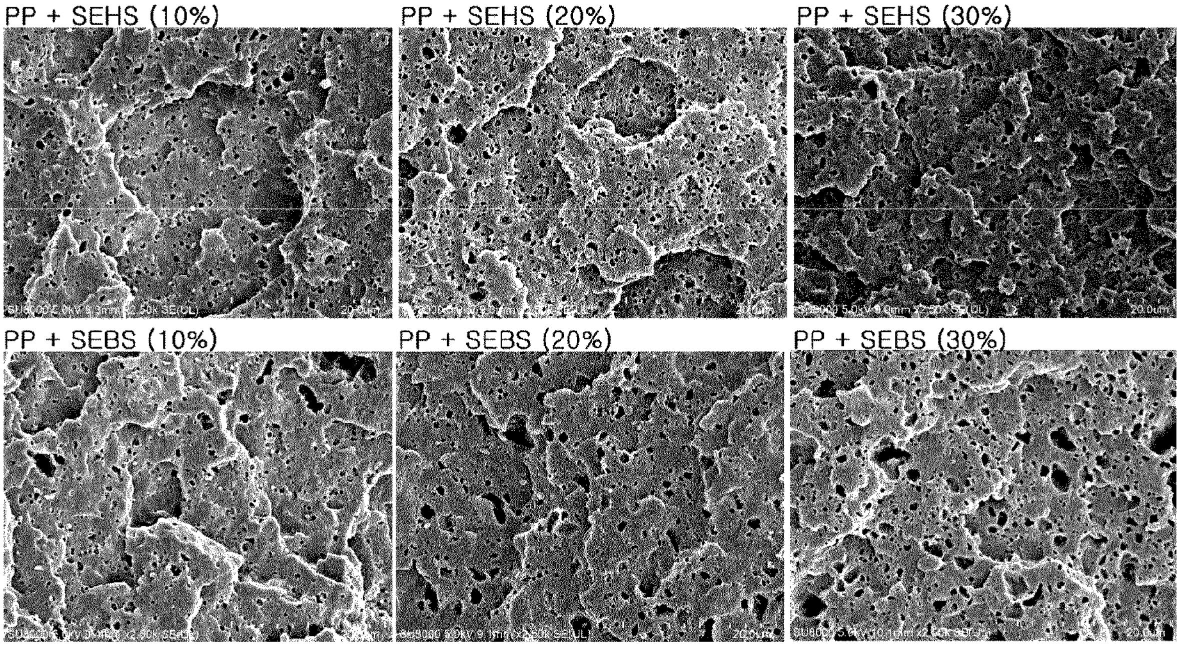
FIG. 3 is a SEM photograph of each resin composition, after each block copolymer domain of Examples 2-5 to 2-7 and Comparative Examples 2-4 to 2-6 has been etched with xylene.

After each block copolymer domain of Examples 2-5 to 2-7 and Comparative Examples 2-4 to 2-6 was etched with xylene, each resin composition was photographed with SEM, and the SEM photographs are shown in FIG. 3.

Specifically, on a xylene at 180° C., the block copolymer prepared in each of Examples 2-5 to 2-7 and Comparative Examples 2-4 to 2-6 was mixed with polypropylene (product name CB5230) in the ratio set forth in Tables 4 to 6 above, and then precipitated in ethanol to recover a resin composition from the solution. The recovered resin composition was dried in a vacuum oven, and then injected into a mold at 210° C. for 10 seconds at a pressure of 6 bar to be molded into a dog bone shape. The impact strength was measured at −40° C. from the specimen in the dog bone shape, and then broken surfaces were treated with a xylene at room temperature for 4 hours to etch SEHS or SEBS, and then photographed with SEM.

From FIG. 3, it was confirmed that in the resin compositions of Examples 2-5 to 2-7 (PP+SEHS) according to the present invention, the block copolymer (SEHS) formed small and uniform domains in a polypropylene (PP) matrix, whereas in the resin compositions of Comparative Examples 2-4 to 2-6 (PP+SEBS), the block copolymer (SEBS) formed large and irregular domains in a polypropylene (PP) matrix. From the above, in the resin composition according to the present invention, it was confirmed that the dispersibility of the block copolymer was excellent.

From the results of Experimental Examples 1 to 5 as described above, it was confirmed that when an organozinc compound was prepared according to the method for preparing an organozinc compound according to the present invention, triethyl borane was not used so that work safety was ensured, and a single compound was synthesized so that a side reaction product such as a dimer was not included, impurities containing chlorine which may act as a catalytic poison were not included, and the removal of impurities containing magnesium which may act as a catalyst poison was facilitated.

In addition, it was confirmed that a chain transfer agent including an organozinc compound prepared according to the method for preparing an organozinc compound according to the present invention was excellent in synthesis reproducibility and polymerization reproducibility.

In addition, it was confirmed that a block copolymer prepared by coordinative chain transfer polymerization and anionic polymerization using the chain transfer agent according to the present invention had a wide molecular weight distribution and excellent mechanical properties.

In addition, it was confirmed that a resin composition according to the present invention included the above block copolymer, thereby having excellent dispersibility for polypropylene, and thus, excellent mechanical physical properties.

The invention claimed is:

1. A chain transfer agent including 96 mol % or more of an organozinc compound represented by Formula 1 below:

[Formula 1]

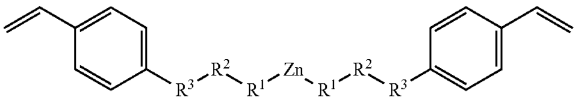

wherein, in Formula 1 above, $R^1$ and $R^3$ are each independently a single bond or an alkylene group having 1 to 10 carbon atoms, $R^2$ is an alkylene group having 1 to 10 carbon atoms or —SiR4R$^5$—, and $R^4$ and $R^5$ are each independently an alkyl group having 1 to 10 carbon atoms.

2. The chain transfer agent of claim 1, wherein a content of Mg and Cl is each independently 10 ppm or less by weight.

3. The chain transfer agent of claim 1, wherein the organozinc compound represented by Formula 1 is included in an amount of 99 mol % or more.

4. The chain transfer agent of claim 1, wherein $R^1$ and $R^3$ are each independently a single bond or an alkylene group having 1 to 3 carbon atoms, $R^2$ is an alkylene group having 1 to 3 carbon atoms or —$SiR^4R^5$—, and $R^4$ and $R^5$ are each independently an alkyl group having 1 to 3 carbon atoms.

5. The chain transfer agent of claim 1, wherein the organozinc compound represented by Formula 1 is one or more selected from the group consisting of organozinc compounds represented by Formulas 1-1 to 1-4 below:

[Formula 1-1]

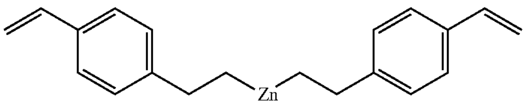

[Formula 1-2]

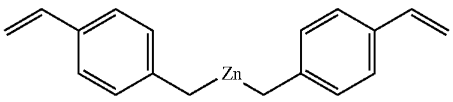

-continued

[Formula 1-3]

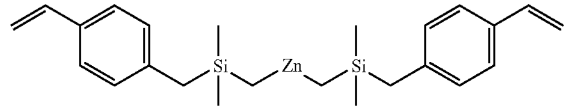

[Formula 1-4]

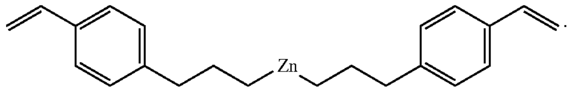

6. A method for preparing the chain transfer agent of claim 1, the method comprising:

preparing a Grignard reagent containing styrene residues; and reacting the prepared Grignard reagent with a zinc compound to prepare an organozinc compound represented by Formula 1 below, wherein the zinc compound is alkyl zinc alkoxide:

[Formula 1]

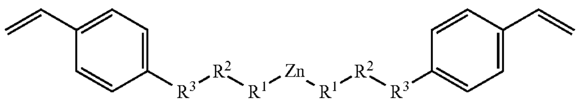

wherein, in Formula 1 above, $R^1$ and $R^3$ are each independently a single bond or an alkylene group having 1 to 10 carbon atoms, $R^2$ is an alkylene group having 1 to 10 carbon atoms or —$SiR^4R^5$—, and $R^4$ and $R^5$ are each independently an alkyl group having 1 to 10 carbon atoms.

7. The method of claim 6, wherein the Grignard reagent containing styrene residues is represented by Formula 2 below:

[Formula 2]

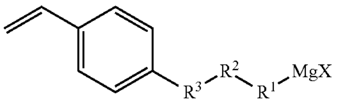

wherein, in Formula 2 above, $R^1$ and $R^3$ are each independently a single bond or an alkylene group having 1 to 10 carbon atoms, $R^2$ is an alkylene group having 1 to 10 carbon atoms or —$SiR^4R^5$—, $R^4$ and $R^5$ are each independently an alkyl group having 1 to 10 carbon atoms, and X is a halogen group.

8. The method of claim 7, wherein the Grignard reagent containing styrene residues and represented by Formula 2 is prepared by the reaction between a compound represented by Formula 3 below and magnesium:

[Formula 3]

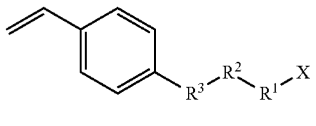

wherein, in Formula 3 above, $R^1$ and $R^3$ are each independently a single bond or an alkylene group having 1 to 10 carbon atoms, $R^2$ is an alkylene group having 1 to 10 carbon atoms or —$SiR^4R^5$—, $R^4$ and $R^5$ are each independently an alkyl group having 1 to 10 carbon atoms, and X is a halogen group.

9. The method of claim 7, wherein the Grignard reagent containing styrene residues and represented by Formula 2 is any one selected from the group consisting of compounds represented by Formula 2-1 to 2-4 below:

[Formula 2-1]

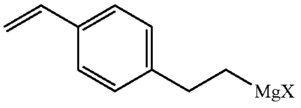

[Formula 2-2]

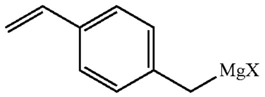

[Formula 2-3]

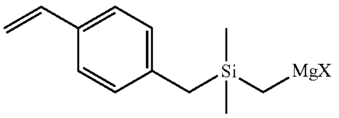

[Formula 2-4]

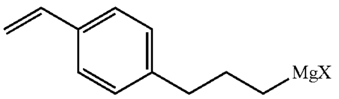

wherein X is a halogen group.

10. The method of claim 8, wherein the compound represented by Formula 3 is any one selected from the group consisting of compounds represented by Formulas 3-1 to 3-4 below:

[Formula 3-1]

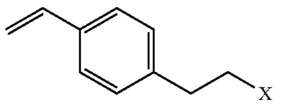

[Formula 3-2]

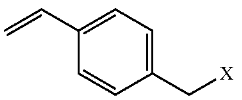

[Formula 3-3]

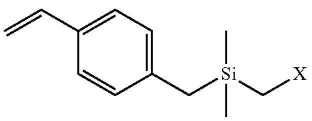

[Formula 3-4]

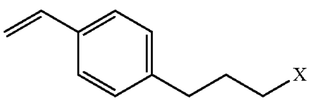

wherein X is a halogen group.

11. The method of claim 6, wherein the zinc compound is ethyl zinc methoxide.

* * * * *